US008819649B2

(12) United States Patent
Lafreniere et al.

(10) Patent No.: US 8,819,649 B2
(45) Date of Patent: Aug. 26, 2014

(54) PROFILE GUIDED JUST-IN-TIME (JIT) COMPILER AND BYTE CODE GENERATION

(75) Inventors: Louis Lafreniere, Seattle, WA (US); Curtis Man, Seattle, WA (US); Jedrzej Miadowicz, Redmond, WA (US); Paul Leathers, Bellevue, WA (US); Jitendra Kumar, Redmond, WA (US); Arjun Bijanki, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 301 days.

(21) Appl. No.: 13/229,594

(22) Filed: Sep. 9, 2011

(65) Prior Publication Data

US 2013/0067441 A1    Mar. 14, 2013

(51) Int. Cl.
*G06F 9/45* (2006.01)

(52) U.S. Cl.
USPC .................... 717/139; 717/140; 717/148

(58) Field of Classification Search
USPC ........................... 717/139–145, 148
IPC ....................... G06F 8/24,8/41, 11/30
See application file for complete search history.

(56) References Cited

U.S. PATENT DOCUMENTS

| | | | |
|---|---|---|---|
| 6,256,784 B1* | 7/2001 | Grove ............................ 717/139 |
| 6,324,687 B1 | 11/2001 | Beadle et al. |
| 6,332,215 B1* | 12/2001 | Patel et al. ..................... 717/141 |
| 6,481,006 B1* | 11/2002 | Blandy et al. ................. 717/139 |
| 6,530,075 B1* | 3/2003 | Beadle et al. ................. 717/114 |
| 6,578,020 B1* | 6/2003 | Nguyen .......................... 706/15 |
| 6,704,926 B1* | 3/2004 | Blandy et al. ................. 717/148 |
| 6,708,169 B1* | 3/2004 | Berry et al. ........................ 1/1 |
| 6,735,761 B1* | 5/2004 | Ogasawara ................... 717/140 |
| 6,760,907 B2* | 7/2004 | Shaylor ......................... 717/158 |
| 6,851,109 B1* | 2/2005 | Alexander et al. ............ 717/148 |
| 6,883,165 B1* | 4/2005 | Blandy et al. ................. 717/148 |
| 7,143,402 B2 | 11/2006 | Ogasawara et al. |
| 7,174,544 B2* | 2/2007 | Zee ................................ 717/148 |
| 7,210,133 B2* | 4/2007 | Souloglou et al. ............ 717/138 |

(Continued)

FOREIGN PATENT DOCUMENTS

JP    2004-110824 A    4/2004
KR    10-1999-0078174 A    10/1999

OTHER PUBLICATIONS

Ogata et al, "Bytecode Fetch Optimization for a Java Interpreter" ACM, pp. 58-67, 2002.*

(Continued)

*Primary Examiner* — Anil Khatri
(74) *Attorney, Agent, or Firm* — Kevin Sullivan; Brian Haslam; Micky Minhas

(57) ABSTRACT

Methods, systems, and computer program products are provided for profiling source code to enable improved source code execution. A runtime engine includes a parser, a bytecode generator, an execution controller, an interpreter, a just-in-time (JIT) compiler, and a profile generator. The parser receives source code coded in a dynamic language and parses the source code to generate parsed source code. The bytecode generator converts the parsed source code to bytecode. The interpreter is configured to interpret the bytecode when enabled by the execution controller. The JIT compiler is configured to compile the bytecode when enabled by the execution controller. The profile generator generates profile information from the bytecode and stores the profile information. The execution controller enables the interpreter or the JIT compiler to perform their respective functions based on the profile information.

18 Claims, 9 Drawing Sheets

(56) References Cited

U.S. PATENT DOCUMENTS

| | | | | |
|---|---|---|---|---|
| 7,225,436 | B1* | 5/2007 | Patel | 717/139 |
| 7,475,214 | B2* | 1/2009 | Hwang | 711/170 |
| 7,665,079 | B1 | 2/2010 | Yasue et al. | |
| 7,844,960 | B2 | 11/2010 | Inglis et al. | |
| 8,104,025 | B2* | 1/2012 | Hogg et al. | 717/140 |
| 8,127,280 | B2* | 2/2012 | Thomas et al. | 717/136 |
| 8,269,745 | B2* | 9/2012 | Fang et al. | 345/174 |
| 8,276,131 | B2* | 9/2012 | Langman et al. | 717/148 |
| 8,291,391 | B2* | 10/2012 | Lee et al. | 717/136 |
| 8,312,439 | B2* | 11/2012 | Kielstra et al. | 717/148 |
| 8,341,609 | B2* | 12/2012 | Lee et al. | 717/141 |
| 8,359,496 | B1 | 1/2013 | Bornstein et al. | |
| 8,370,818 | B2* | 2/2013 | Osminer et al. | 717/140 |
| 8,522,222 | B2* | 8/2013 | Tillmann | 717/148 |
| 8,683,453 | B2* | 3/2014 | Patel et al. | 717/139 |
| 2002/0104076 | A1 | 8/2002 | Shaylor | |
| 2003/0093779 | A1 | 5/2003 | Bak | |
| 2004/0194076 | A1 | 9/2004 | Comp et al. | |
| 2010/0235819 | A1 | 9/2010 | Rose | |
| 2011/0035735 | A1 | 2/2011 | Kramp et al. | |

OTHER PUBLICATIONS

Ishizaki et al, "Effectiveness of Cross-Platform Optimizations for a Java Just-In-Time Compiler", ACM, pp. 187-204, 2003.*

Ansel et al, "Language-Independent Sandboxing of Just-In-Time Compilation and Self-Modifying Code", ACM, 355-366, 2011.*

Chander et al, "Mobile Code Security by Java Bytecode Instrumentation ", IEEE, pp. 27-40, 2001.*

"International Search Report", Mailed Date: May 9, 2013, Application No. PCT/US2013/023958, Filed Date: Jan. 31, 2013, pp. 9.

"International Search Report", Mailed Date: Feb. 26, 2013, Application No. PCT/US2012/054044, Filed Date: Sep. 7, 2012, pp. 11.

Aycock, John, "A Brief History of Just-In-Time", Retrieved at <<http://citeseerx.ist.psu.edu/viewdoc/download?doi=10.1.1.97.3985&rep=rep1&type=pdf>>,Proceedings of ACM Computing Surveys,vol. 35, No. 2, Jun. 2003, pp. 97-113.

Hsieh, et al., "Java Bytecode to Native Code Translation: The Caffeine Prototype and Preliminary Results", Retrieved at <<http://ieeexplore.ieee.org/stamp/stamp.jsp?tp=&arnumber=566453>>, Proceedings of the 29th Annual IEEE/ACM International Symposium on Microarchitecture Dec. 2-4, 1996, pp. 90-97.

Kotzmann, Thomas, "Escape Analysis in the Context of Dynamic Compilation and Deoptimization", Retrieved at <<http://www.ssw.jku.at/Research/Papers/Ko05b/phd-kotzmann.pdf>>, Oct. 2005, pp. 154.

Agesen, et al., "Mixed-mode Bytecode Execution", Retrieved at <<http://research.sun.com/technical-reports/2000/smli_tr-2000-87.pdf>>, Jun. 2000, pp. 16.

Whaley, John, "Partial Method Compilation using Dynamic Profile Information", Retrieved at <<http://citeseerx.ist.psu.edu/viewdoc/download?doi=10.1.1.13.2924&rep=rep1&type=pdf >>,Proceedings of the 16th ACM SIGPLAN conference on Object-oriented programming, systems, languages, and applications, 2001, pp. 14.

Bala, et al., "Dynamo: A Transparent Dynamic Optimization System", Retrieved at <<http://personales.ac.upc.edu/vmoya/docs/bala.pdf>>, Proceedings of the ACM SIGPLAN 2000 conference on Programming language design and implementation, 2000, pp. 12.

"Transferring Program Execution From Compiled Code to Interpreted Code" U.S. Appl. No. 13/368,330, filed Feb. 7, 2012, 36 Pages.

Chang, et al., "Using Profile Information to Assist Classic Code Optimizations", Retrieved at <<http://citeseerx.ist.psu.edu/viewdoc/download?doi=10.1.1.14.4115&rep=rep1&type=pdf>>, Software-Practice and Experience, vol. 21, No. 12, Dec. 1991, pp. 1301-1321.

Chen, et al., "Profile-guided Proactive Garbage Collection for Locality Optimization", Retrieved at <<http://research.microsoft.com/en-us/groups/rad/halo.pdf>>, Proceedings of the ACM SIGPLAN Conference on Programming Language Design and Implementation, Jun. 11-14, 2006, pp. 10.

Whaley, "Partial Method Compilation using Dynamic Profile Information", Retrieved at <<http://citeseerx.ist.psu.edu/viewdoc/download?doi=10.1.1.13.2924&rep=rep1&type=pdf>>, Proceedings of the 16th ACM SIGPLAN conference on Object-oriented programming, systems, languages, and applications, Oct. 13-19, 2001, pp. 14.

Gal, et al., "Incremental Dynamic Code Generation with Trace Trees", Retrieved at <<http://citeseerx.ist.psu.edu/viewdoc/download?doi=10.1.1.113.557&rep=rep1&type=pdf>>, Technical Report ICS-TR-06-16, 11 pages.

* cited by examiner

PROFILE GUIDED JUST-IN-TIME (JIT) COMPILER AND BYTE CODE GENERATION

BACKGROUND

Many types of programming languages exist. One form of programming language is a scripting language. A scripting language is a programming language that enables control of one or more applications. A "script", or program generated according to a scripting language, may be written in a same language or a different language from that of an associated application. While applications are typically first compiled to native machine code, scripts are often interpreted from source code.

Another form of programming language is a dynamic programming language. A dynamic programming language is a programming language that performs some behaviors during runtime that other programming languages (that are not dynamic) may perform during compilation. Such behaviors may include extending a program by adding new code, extending objects and definitions, and/or modifying the type system. Many scripting programming languages are also dynamic programming languages.

A web browser is an application for rendering web pages for display. Scripts are frequently run on web pages in order to dynamically change their content. Client-side scripting generally refers to scripts that are executed client-side by a web browser rather than being executed server-side on a web server. Client-side scripting can make web pages more responsive to user input by avoiding one or more round trip communications with the web server.

Scripts written in dynamic programming languages are difficult to execute efficiently. For instance, JavaScript™ (developed by Mozilla Foundation of Mountain View, Calif.) is an example dynamic programming language used in scripts that is very flexible. In many JavaScript™ programs, only a portion of the JavaScript™ code is executed, and an even smaller portion of the JavaScript™ code is run during the program start-up. As such, parsing of the entire code base unnecessarily delays the start of execution. In addition, most code actually written in JavaScript™ does not exploit the full range of the JavaScript™ language's flexibility. However, the machine code generated by a JavaScript™ compiler is generated to correctly handle a wide spectrum of possibilities at runtime, which results in inefficient execution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for executing scripts and other programs written in dynamic languages in an efficient manner. A script may be received by a runtime engine for execution as part of a web page or other document. The runtime engine may use an interpreter to execute the script. Profile information regarding the script is collected by the interpreter during execution of the script. The profile information may be used to determine portions of the script that may be more efficiently executed by compiling the portions using a compiler and executing the resulting machine code rather than interpreting those portions of the script. As such, some portions of a script may be executed using an interpreter, and other portions of the script may be compiled using a compiler and executed. Furthermore, the compiled portions of the script may be stored for later use if those portions of the script are subsequently executed again. Still further, startup portions of the script may be determined and indicated in the profile information so that the startup portions may be first processed by the runtime engine in subsequent runs of the script.

In one example method implementation, source code coded in a dynamic language is received for execution. The source code is parsed to generate parsed source code. The parsed source code is converted to bytecode. The bytecode is interpreted using an interpreter. Profile information regarding the bytecode is generated. The profile information is stored.

Furthermore, the profile information may be analyzed to determine a condition associated with a received portion of the bytecode. The bytecode portion may be just-in-time (JIT) compiled into a compiled bytecode portion as a result of the determined condition. The compiled bytecode portion may be stored.

Still further, the bytecode portion may be later received again in the bytecode at the interpreter. The compiled bytecode portion corresponding to the received bytecode portion may be located in storage. At least one condition check may be performed on the compiled bytecode portion located in storage. The compiled bytecode portion may be executed instead of interpreting the received bytecode portion if the at least one condition check passes.

In an example system implementation, a runtime engine is provided. The runtime engine includes a parser, a bytecode generator, an execution controller, an interpreter, a JIT compiler, and a profile generator. The parser receives source code coded in a dynamic language and parses the source code to generate parsed source code. The bytecode generator converts the parsed source code to bytecode. The interpreter is configured to interpret the bytecode when enabled by the execution controller. The JIT compiler is configured to compile the bytecode when enabled by the execution controller. The profile generator generates profile information from the bytecode and stores the profile information. The execution controller enables the interpreter or the JIT compiler to perform their respective functions based on the profile information.

Computer program products are also described herein for generating profile information from source code, and enabling efficient execution of the source code based on the profile information, as well as for enabling additional embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
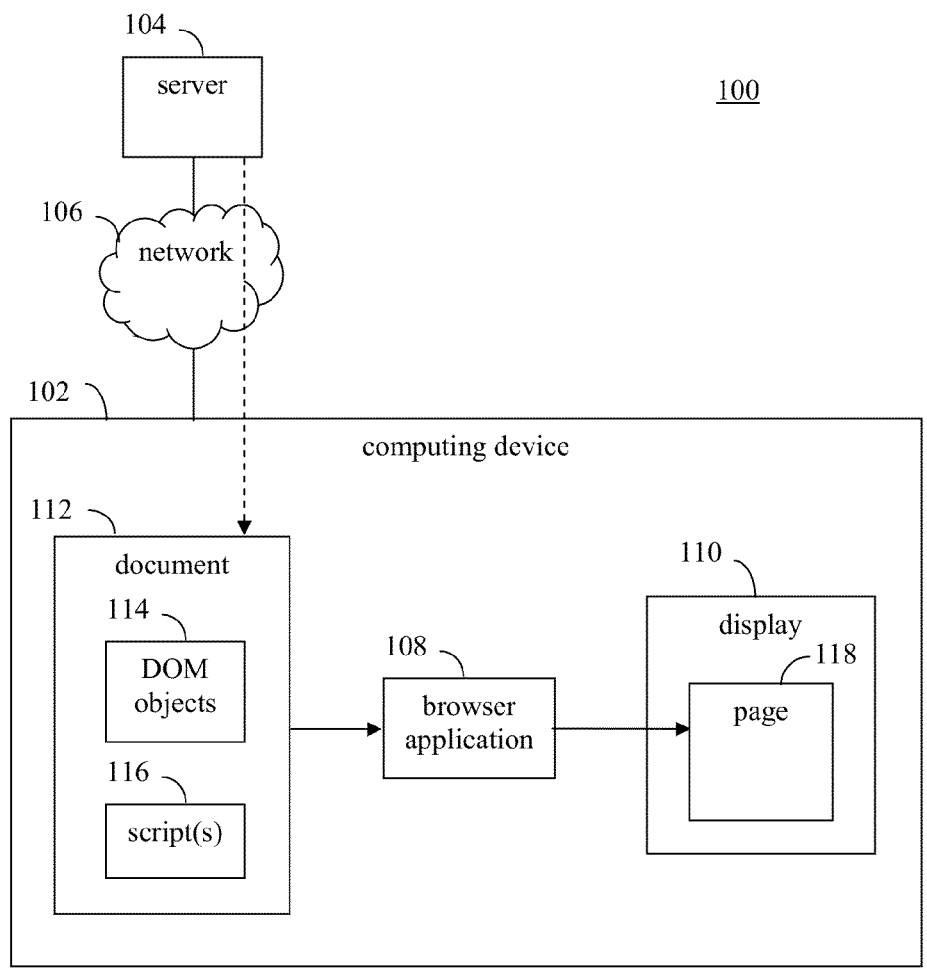
FIG. 1 shows a block diagram of computing device that includes a browser application configured to render pages from received documents, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

Dynamic languages are frequently used for code in scripts to control web browsers. Examples of such dynamic languages include JavaScript™ (developed by Mozilla Foundation of Mountain View, Calif.), VBScript (developed by Microsoft Corporation of Redmond, Wash.), AJAX (asynchronous JavaScript™ and XML), Python (developed by the Python Software Foundation of Delaware, United States), Perl (which is an open source programming language developed by Larry Wall), etc. Scripts are typically parsed and interpreted or compiled on the client-side on demand (e.g., as a web page is downloaded by a web browser). For many scripts, only a portion of the script source code is executed, and an even smaller portion of the source code is run during the program start-up. For instance, for many web pages, only about 15%-20% of the code loaded for a user is actually executed. As such, parsing of the entire source code may unnecessarily delay the start of execution. In addition, much script code does not exploit the full range of the script language's flexibility. However, the machine code generated by a script compiler is generated to correctly handle a wide spectrum of possibilities at runtime, which results in inefficient execution.

For instance, dynamic languages enable scripts to be generated that have different and changing content during runtime depending on user input, environmental conditions, such as the time of day, or other variables. Objects expressed in such dynamic languages may have changing types, objects may change in shape (e.g., may have properties dynamically added), expression values may change, and/or other code factors may change dynamically during runtime. As such, scripts coded in dynamic languages are typically interpreted line by line rather than being compiled up front and subsequently executed, because the script content may not be known in its entirety during compile time. Because of these complexities, scripts coded in a dynamic language are typically executed inefficiently, which is undesirable to users to whom output of the scripts may be displayed (e.g., user interfaces, etc.).

In embodiments, scripts are executed more efficiently, such that some portions of the script may be interpreted, while other portions of the script are compiled and executed as machine code. An interpreter can start executing script code relatively quickly (low startup cost). However, interpreted script code executes more slowly than machine code. Although machine code can be executed faster than an interpreter can execute, the compiling of script code into machine code before its execution can be time consuming (high startup cost). Thus, embodiments leverage attributes of a script to interpret portions of the script in some instances, while compiling portions of the script just-in-time into machine code for execution in other instances. For example, portions of a script that are not frequently used may be interpreted (on the fly), while portions of the script that are used more frequently may be compiled and executed. Furthermore, the compiled script code may optionally be stored to save time during future execution of the script. As such, embodiments enable a script to execute more rapidly than prior techniques.

For example, in an embodiment, when a script is executed, profile data/information (profile information) is gathered about patterns that occur in the script. Examples of such patterns include code that is executed relatively frequently ("hotspots"). Once a sufficient amount of profile data regarding the script is gathered, the data may be used by the compiler to generate a better optimized machine code specific to the execution pattern recorded in the profile data. A processor that executes the script may be switched to the optimized code path as desired, so that execution of the script is sped up. The profile data may be saved in persistent storage and accessed during subsequent executions of the script. Furthermore, the profile data may indicate portions of the script that are performed during a startup of the script. This profile data may be used to shorten a length of time of a startup phase for the script (which may include parsing the script code and generating bytecode from the script) by having the startup portions of the script interpreted or compiled first.

Such embodiments may be implemented in a variety of environments. For instance, FIG. 1 shows a block diagram of a web browsing environment 100, according to an example embodiment. As shown in FIG. 1, environment 100 includes a computing device 102, a server 104, and a network 106. As shown in FIG. 1, computing device 102 includes a browser application 108. Environment 100 is described as follows. Environment 100 is provided for purposes of illustration, and it not intended to be limiting. Embodiments may be implemented in further environments, as would be apparent to persons skilled in the relevant art(s) from the teachings herein.

Computing device 102 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device. Server 104 may be implemented in one or more computer systems, including one or more servers, which may be any type of computing device described herein or otherwise known that is capable of enabling the corresponding functionality described herein.

Computing device 102 and server 104 are communicatively coupled by network 106. Network 106 may include one or more communication links and/or communication networks, such as a PAN (personal area network), a LAN (local area network), a WAN (wide area network), or a combination of networks, such as the Internet. Computing device 102 and server 104 may be communicatively coupled to network 106 using various links, including wired and/or wireless links, such as IEEE 802.11 wireless LAN (WLAN) wireless links, Worldwide Interoperability for Microwave Access (WiMAX) links, cellular network links, wireless personal area network (PAN) links (e.g., Bluetooth™ links), Ethernet links, USB links, etc.

A single computing device 102 is shown in FIG. 1 for purposes of illustration. However, any number of computing devices 102 may be present in environment 100, including tens, hundreds, thousands, and even greater numbers of computing devices 102. Each computing device may operate one or more corresponding browser applications.

Browser application 108 is a program that executes/operates in computing device 102. Browser application 108 enables network information resources to be retrieved, presented, and traversed. An information resource or object may be retrieved by browser application 108 using a network address, such as a uniform resource identifier (URI). Examples of information resources include web pages, images, videos, and other forms of content. Hyperlinks that are present in information resources enable users easily to navigate their browsers to related resources. Examples of browser application 108 include Internet Explorer®, developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif.

As shown in FIG. 1, browser application 108 may retrieve a document 112 from a server 104 through network 106. Document 112 may be a web document that includes code of a markup language, such as hyperText markup language (HTML), dynamic HTML (DHTML), extensible HTML (XHTML), extensible markup language (XML), etc. As shown in FIG. 1, document 112 includes DOM (document object model) objects 114 and one or more scripts 116. DOM objects 114 include one or more objects represented in document 112 according to the DOM convention, which is a cross-platform and language-independent convention for representing and interacting with objects. DOM objects 114 may include objects that are directly included in document 112, and/or are referenced by document 112 and separately retrieved from server 104 or other server. Script(s) 116 include code formatted according to a dynamic language (e.g., JavaScript™, VBScript, AJAX, Python, Perl, etc.) that enables changes to be made to DOM objects 114, including changes based on factors such as user input, environmental conditions (e.g., the time of day, or other variables), etc. The code of script(s) 116 can access and modify objects of DOM objects 114 on the fly without returning to server 104.

As shown in FIG. 1, browser application 108 receives (e.g., loads) document 112. Browser application 108 includes a browser engine (e.g., a layout engine or rendering engine) that formats information of document 112, and displays the formatted information. For example, as shown in FIG. 1, browser application 108 may generate a page 118 based on document 112 that is displayed by a display of computing device 102.

Figure 2:
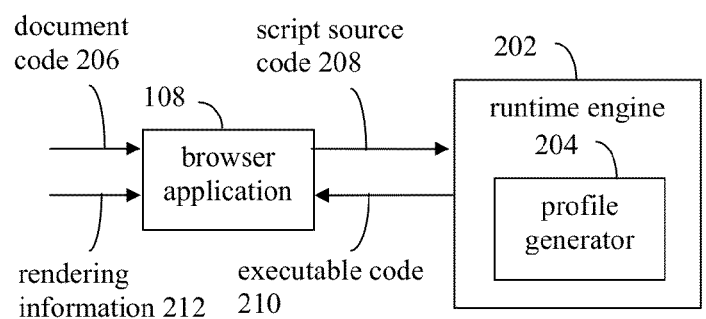
FIG. 2 shows a block diagram of a browser application that interacts with a runtime engine configured to execute scripts and to generate profile information about the scripts, according to an example embodiment.

Browser application 108 may be configured to execute one or more scripts 116 that are embedded in document 112, or separate from but associated with document 112. For instance, FIG. 2 shows a block diagram of browser application 108 interacting with a runtime engine 202, according to an example embodiment. Runtime engine 202 is configured to execute scripts for browser application 108, such as script(s) 116 of FIG. 1. In one embodiment, runtime engine 202 may be separate from browser application 108 as shown in FIG. 2, such as a plug-in or add-in module to browser application 108. In another embodiment, runtime engine 202 may be integrated in browser application 108.

As shown in FIG. 1, browser application 108 receives document code 206, which is code in document 112 and/or referenced by document 112. A browser engine of browser application 108 executes document code 206. If browser application 108 encounters a script of document 112, browser application 108 may provide script source code 208 of the script to runtime engine 202 for execution. Runtime engine 202 is a runtime engine for scripts programmed in a dynamic programming language (or "dynamic language"). As such, runtime engine 202 enables dynamic typing and further features of dynamic languages. In an embodiment, runtime engine 202 may be implemented as a virtual machine (VM). With dynamically typed languages, such as JavaScript™, Python, etc., often it is not known what type various items of data may assume until the program code is actually executed. For instance, it may not be known whether a dynamically typed variable is an integer, a float, or a string until the code is actually executed by the runtime engine. Runtime engine 200 is configured to handle such dynamic capabilities of a dynamic languages when executing source code 208.

Runtime engine 202 may generate executable code 210 based on executing script source code 208, which may be executed (e.g., by one or more processors). Browser application 108 may generate rendering information 212 based on the execution of document code 206 and based on executable code 210.

As shown in FIG. 2, runtime engine 202 includes a profile generator 204. Profile generator 204 is configured to analyze script source code 208 to collect statistics and further information about script source code 208. For instance, profile generator 204 may determine frequently performed portions of script source code 208, startup portions of script source code 208, and/or further information regarding script source code 208. Profile generator 204 may maintain the collected information as profile information. Runtime engine 202 may use the collected profile information to more efficiently execute script source code 208, as described herein.

Numerous exemplary embodiments of runtime engine 202 and further embodiments for improving script execution performance are described as follows. For instance, the next subsection describes example embodiments for runtime engine structures and processes for operating runtime engines. Subsections follow that describe example embodiments for collecting source code profile information, for optimizing source code portions based on the collected profile information, and for executing the optimized source code.

A. Example Embodiments for Runtime Engines

Figure 3:
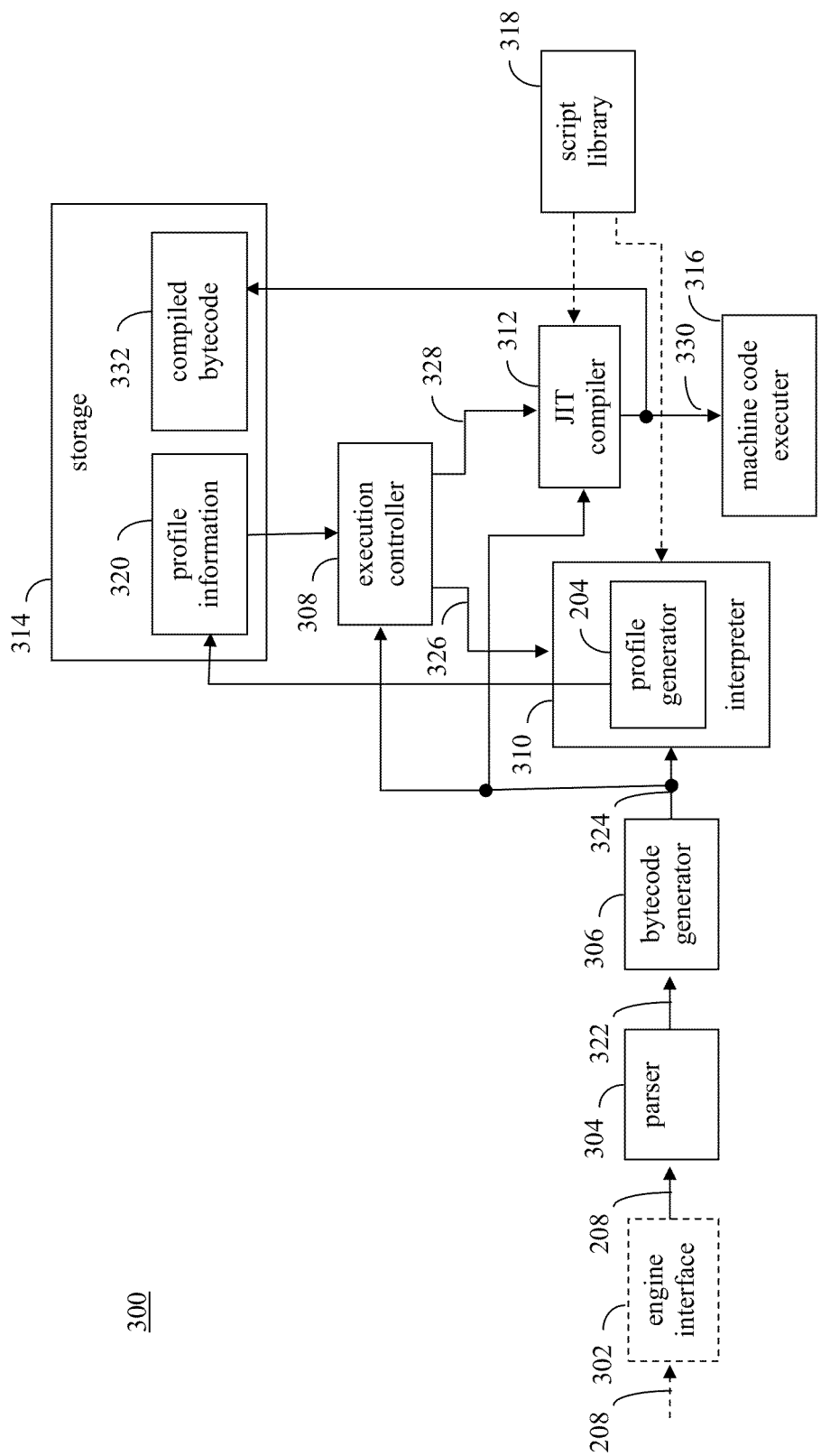
FIG. 3 shows a block diagram of a runtime engine configured to interpret portions of a script and to execute compiled portions of the script based on profile information generated based on the script, according to an example embodiment.

According to an example embodiment, a runtime engine (such as runtime engine 202 of FIG. 2) is configured to collect profile information regarding a script being executed, and to use the profile information to improve script execution performance. Such runtime engines may be configured in various ways, in embodiments. For instance, FIG. 3 shows a block diagram of a runtime engine 300, according to an example embodiment. As shown in FIG. 3, runtime engine 300 includes an engine interface 302, a parser 304, a bytecode generator 306, an execution controller 308, an interpreter 310, a JIT (just-in-time) compiler 312, storage 314, a machine code executor 316, and a script library 318. Runtime engine 300 is described as follows.

As shown in FIG. 3, engine interface 302 receives script source code 208. Engine interface 302 is optionally present, and in some embodiments, parser 304 may be configured as an interface to runtime engine 300 rather than having engine interface 302 present. When present, engine interface 302 is a communication interface that provides one or more methods for interfacing a host with runtime engine 300. In one example, embodiment, engine interface 302 may be implemented according to IActiveScript developed by Microsoft Corporation of Redmond, Wash. As shown in FIG. 3, engine interface 302 provides source code 208 to parser 304.

Parser 304 receives and parses source code 208. For instance, parser 304 may perform token generation or lexical analysis on source code 208, so that source code 208 is formatted into symbols or tokens. Parser 304 may perform error checking on the tokens to determine whether allowable expressions are formed, that syntax errors are not present, etc. As shown in FIG. 3, parser 304 outputs the parsed source code as parsed source code 322. Parsed source code 322 may have any suitable form, including being generated by parser 304 as AST (abstract syntax tree) code, which includes a tree representation of the abstract syntactic structure of source code 208, as would be known to persons skilled in the relevant art(s).

As shown in FIG. 3, bytecode generator 306 receives parsed source code 322. Bytecode generator 306 is configured to convert parsed source code 322 into bytecode, which includes instruction sets configured for efficient execution by an interpreter, as well as for further compilation into machine code. For instance, generated bytecode may represent parsed source code 322 as numeric codes and corresponding optional parameters. As shown in FIG. 3, bytecode generator 306 outputs the generated bytecode as bytecode 324. Bytecode 324 may have any suitable form, including being generated by bytecode generator 306 in the form of p-code (portable code), as would be known to persons skilled in the relevant art(s).

As shown in FIG. 3, execution controller 308, interpreter 310, and JIT compiler 312 each receive bytecode 324. Furthermore, as shown in FIG. 3, interpreter 310 includes profile generator 204. Profile generator 204 is configured to analyze bytecode 324 to collect statistics and further information regarding source code 208. Profile generator 204 generates profile information 320, which includes the collected information, and which is stored in storage 314.

As shown in FIG. 3, execution controller 308 accesses profile information 320, and is communicatively coupled to interpreter 310 and JIT compiler 312. Based on bytecode 324 and profile information 320, execution controller 308 may enable one of interpreter 310 and JIT compiler 312 to operate on bytecode 324. Interpreter 310 is configured to interpret bytecode 324 when enabled by an interpreter control signal 326 received from execution controller 308. JIT compiler 312 is configured to compile bytecode 324 when enabled by a compiler control signal 328 received from execution controller 308. For instance, during a first execution of source code 208, profile information 320 may not yet exist. In such case, execution controller 308 may enable interpreter 310 to interpret bytecode 324 and to generate profile information 320. During subsequent execution of source code 208 (e.g., later during the same first execution of source code 208, and/or during a subsequent execution of source code 208), execution controller 308 may enable interpreter 310 to interpret portions of source code 208, and may enable JIT compiler 312 to compile other portions of source code 208, based on profile information 320.

When interpreter 310 is enabled by interpreter control signal 326, interpreter 310 interprets and executes bytecode 324. For instance, interpreter 310 may be implemented as a JavaScript™ interpreter, a VBScript interpreter, a Python interpreter, or as an interpreter for another dynamic language mentioned elsewhere herein or otherwise known. In this manner, source code 208 may be at least partially executed by operation of interpreter 310.

When JIT compiler 312 is enabled by compiler control signal 328, JIT compiler 312 compiles bytecode 324. For instance, JIT compiler 312 may be implemented as a JavaScript™ compiler, a VBScript compiler, a Python compiler, or as a compiler for another dynamic language mentioned elsewhere herein or otherwise known. JIT compiler 312 is referred to as a "just in time" compiler, because particular bytecode portions may be compiled by JIT compiler 312 as the compiled bytecode is needed (e.g., is going to be executed imminently) rather than pre-compiling bytecode 324 in its entirety prior to execution. As shown in FIG. 3, JIT compiler 312 generates compiled bytecode 330, which has the form of machine executable code or instructions. Compiled bytecode 330 is received by machine code executer 316 (e.g., one or more processors), which executes compiled bytecode 330. In this manner, source code 208 may be partially executed by operation of JIT compiler 312 and machine code executer 316. Furthermore, as shown in FIG. 3, compiled bytecode 330 may be stored in storage 314 as compiled bytecode 332 for access during subsequent execution of source code 208 by runtime engine 300.

Figure 4:
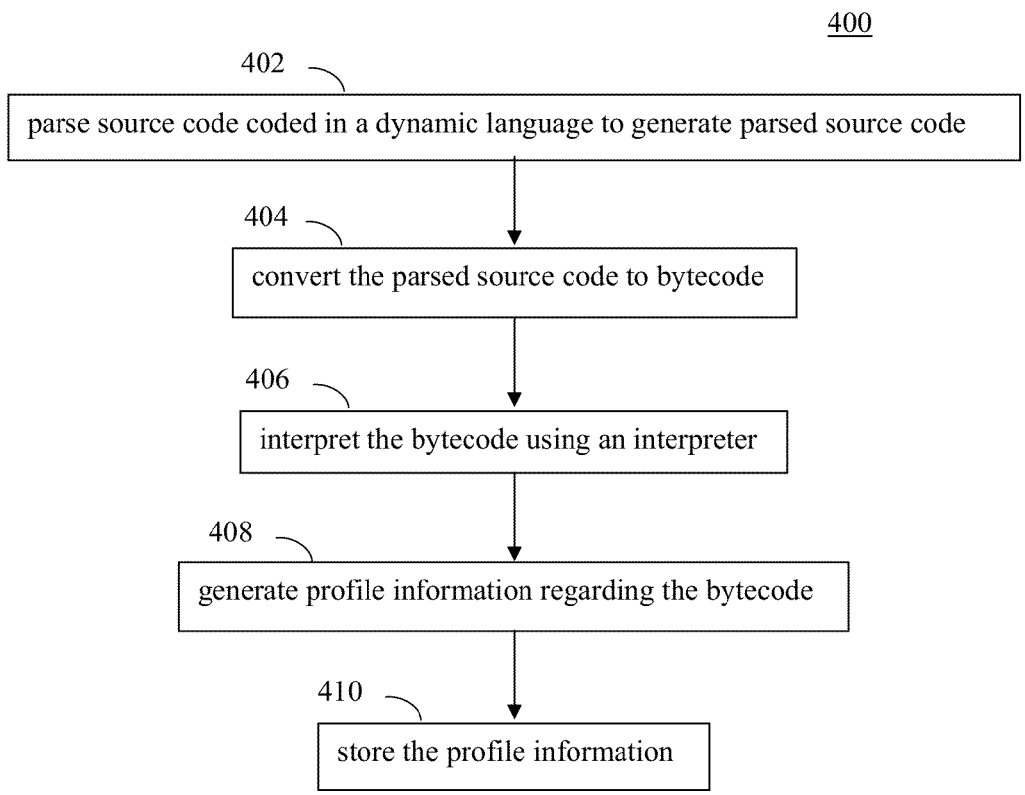
FIG. 4 shows a flowchart providing a process for executing a script and generating profile information for the script, according to an example embodiment.

Runtime engine 300 of FIG. 3 may operate in various ways to perform its functions. For instance, FIG. 4 shows a flowchart 400 providing a process for executing a script and generating profile information for the script, according to an example embodiment. Flowchart 400 is described as follows with reference to FIG. 3. Further structural and operational embodiments will be apparent to persons skilled in the relevant art(s) based on the following discussion regarding flowchart 400.

Flowchart 400 begins with step 402. In step 402, source code coded in a dynamic language is parsed to generate parsed source code. For example, as shown in FIG. 3, parser 304 receives script source code 208 (optionally through engine interface 302). As described above, parser 304 is configured to parse source code 208 into parsed source code 322.

In step 404, the parsed source code is converted to bytecode. For instance, as shown in FIG. 3, bytecode generator 306 receives parsed source code 322. As described above, bytecode generator 306 is configured to convert parsed source code 322 into bytecode 324. Note that steps 402 and 404 may be considered together as a process for generating bytecode 324 from received source code 208, and may be performed in other ways, in embodiments.

In step 406, the bytecode is interpreted using an interpreter. For example, as shown in FIG. 3, interpreter 310 receives bytecode 324. As described above, interpreter 310 is configured to interpret bytecode 324. For instance, interpreter 310 may interpret bytecode 324 by translating bytecode 324 to an efficient intermediate code representation, and executing the intermediate code representation, or interpreting bytecode 324 in another manner to perform program execution.

In step 408, profile information regarding the bytecode is generated. For example, as shown in FIG. 3, profile generator 204 receives bytecode 324. Profile generator 204 is configured to analyze bytecode 324 to collect statistics and further information regarding source code 208. Profile generator 204 generates profile information 320, which includes the collected information.

In step 410, the profile information is stored. For example, as shown in FIG. 3, profile generator 204 stores profile information 320 in storage 314. Note that storage 314 may include one or more of any type of storage mechanism, including a magnetic disc (e.g., in a hard disk drive), an optical disc (e.g., in an optical disk drive), a magnetic tape (e.g., in a tape drive), a memory device such as a RAM (random access memory) device, etc., and/or any other suitable type of storage medium.

Note that runtime engine 300 and/or flowchart 400, when implemented as code that is executed in one or more processors, may be distributed over one or more program execution threads in any manner For instance, in one example, parser 304, bytecode generator 306, execution controller 308, and interpreter 310 may operate in a first thread (e.g., a foreground or UI thread), and JIT compiler 312 may operate in a second thread (e.g., a background thread). In other embodiments, runtime engine 300 may be distributed over threads in other ways.

The following subsection describes example embodiments for collecting profile information.

B. Example Embodiments for Collecting Profile Information

Figure 5:
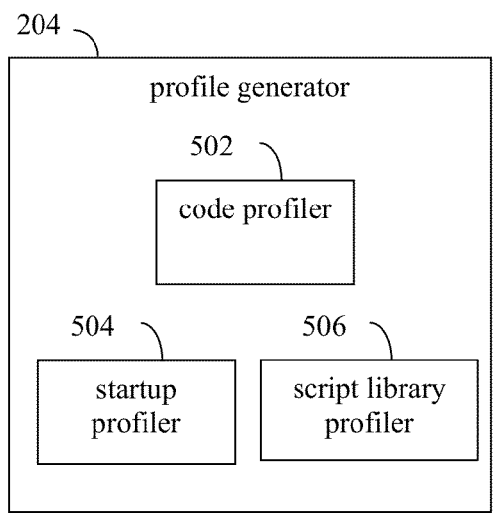
FIG. 5 shows a block diagram of a profile generator, according to an example embodiment.

As described above with respect to FIGS. 3 and 4, profile generator 204 is configured to analyze bytecode 324 to collect statistics and further historical information regarding source code 208, to generate profile information 320. Profile generator 204 may be configured in various ways to perform its functions. For instance, FIG. 5 shows a block diagram of profile generator 204, according to an example embodiment. As shown in FIG. 5, profile generator 204 includes a code profiler 502, a startup profiler 504, and a script library profiler 506. In embodiments, profile generator 204 may include any one or more of these features. Profile generator 204 of FIG. 5 is described as follows.

Code profiler 502 is configured to analyze bytecode 324 for patterns that occur multiple times, and to generate statistics and/or other historical information regarding the patterns, which is included in profile information 320. The historical pattern information may be used to detect the presence of frequently executed functions ("hotspots"), loop bodies, helper calls, property accesses, etc., in bytecode 324. By indicating the presence of such patterns, the historical pattern information may be used to more efficiently execute source code 208, such as by enabling machine code to be generated for commonly occurring patterns.

For instance, code profiler 502 may monitor and track how many times a particular script function is performed in bytecode 324 during execution of source code 208. In profile information 320, code profiler 502 may indicate an identifier or a name of the function (in bytecode or other form) in association with a number of times the function is performed during execution of bytecode 324.

In an embodiment, each function of a script may have a corresponding function identifier (e.g., a numeric identifier, an alphanumeric identifier, etc.) assigned to it in profile information 320. The function identifiers may be generated in any manner (e.g., by sequentially numbering the functions as each function is profiled, generating a hash value for each function, etc.), and may be used to uniquely identify each function in profile information 320 for any purpose. For instance, an index may be stored that maps functions in bytecode 324 to their corresponding identifiers. During subsequent executions of source code 208, each time a function is encountered in bytecode 324, the index may be accessed to determine the identifier assigned to the function. Then, the identifier may be located in profile information 320 to locate any stored profile information for the function.

In another example, code profiler 502 may monitor and track how many times a particular loop of code ("code loop" or "loop body") is performed in bytecode 324 during execution of source code 208. In profile information 320, code profiler 502 may indicate a start instruction and a finish instruction for the code loop to identify the code loop, for example, or may indicate the code loop in another manner. Code profiler 502 may indicate a number of times the code loop is performed in association with the identified code loop.

In another example, code profiler 502 may monitor and track objects (e.g., variables) in bytecode 324. For instance, in profile information 320, code profiler 502 may indicate an object, and may indicate one or more of a type of the object (e.g., an integer, a floating point value, etc.), a shape of the object (e.g., the properties of the object), and/or other object features each time that the object is accessed and/or modified. In further examples, code profiler 502 may monitor and track features of arrays (e.g.: array type or array bounds), values of object properties, etc.

Code profiler 502 may also indicate in profile information 320 any portions of bytecode 324 that are not used (not executed), including any functions, objects, loops, etc., that are not used. For example, source code 208 may include errors in coding that lead to portions of code that are not used, may include utilities or library modules that are not used (e.g., may only use a portion of a library that is included in source code 208 in its entirety), and/or may include test code that was used during source code testing but is not during normal operation. In embodiments, during source code execution, execution controller 308 may instruct parser 304 to not parse (or partially parse) portions of bytecode 324 indicated as not used in profile information 320, to increase execution efficiency.

In further embodiments, code profiler 502 may track generate further statistics and/or other historical information regarding bytecode 324, and may include the historical information in profile information 320.

Figure 6:
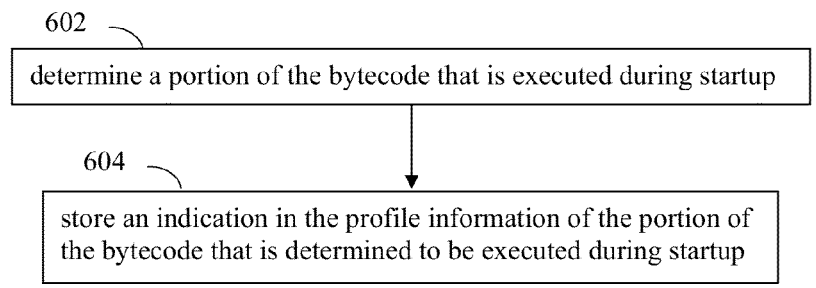
FIG. 6 shows a flowchart providing a process for indicating a startup portion of a script in profile information, according to an example embodiment.

Startup profiler 504 is configured to analyze bytecode 324 for bytecode that is used at the beginning of the execution of source code 208, and to indicate this "startup" bytecode in profile information 320. For example, in an embodiment, startup profiler 504 may perform a flowchart 600 in FIG. 6. Flowchart 600 provides a process for indicating a startup portion of source code in profile information, according to an example embodiment. Flowchart 600 is described as follows.

Flowchart 600 begins with step 602. In step 602, a portion of the bytecode that is executed during startup is determined. For example, in an embodiment, startup profiler 504 may determine a startup portion of bytecode 324 that is executed first when execution of source code 208 begins. Startup profiler 504 may determine the startup portion of bytecode 324 in any manner, such as by determining a predetermined number of functions of bytecode 324 that occur when bytecode 324 is first received at profile generator 204, determining a predetermined number of instructions (e.g., a predetermined number of lines of bytecode 324) that occur when bytecode 324 is first received at profile generator 204, or in another manner.

In step 604, an indication is stored in the profile information of the portion of the bytecode that is determined to be executed during startup. For example, in an embodiment, startup profiler 504 may indicate the startup portion determined in step 602 in profile information 320. Startup profiler 504 may indicate the startup portion in profile information 320 in any manner, by indicating function names or identifiers, by indicating blocks of bytecode by line number, by indicating starting and ending instructions for the startup portion, or in any other manner.

Script library profiler 506 is configured to analyze bytecode 324 for any accesses to script library modules that are used during the execution of source code 208, and to indicate these accessed script library modules in profile information 320. For instance, as shown in FIG. 3, interpreter 310 and/or JIT compiler 312 may access a script library 318 during execution of source code 208. Script library 318 may include one or more library modules that include pre-coded functions. These pre-coded functions may be accessed by source code 208 so that a developer of source code 208 does not have to generate code for these functions, saving development time. For instance, script library 318 may be a JavaScript™ library that includes modules of pre-coded JavaScript™, may be an AJAX library that includes modules of pre-coded AJAX, and/or may be a library for another dynamic language. The library modules of script library 318 may be parsed by parser 304 and converted by bytecode by bytecode generator 306, if needed, prior to being interpreted and/or compiled. In embodiments, during source code execution, execution controller 308 may instruct parser 304 to not parse library modules of script library 318 not indicated as used in profile information 320, to increase execution efficiency.

Figure 7:
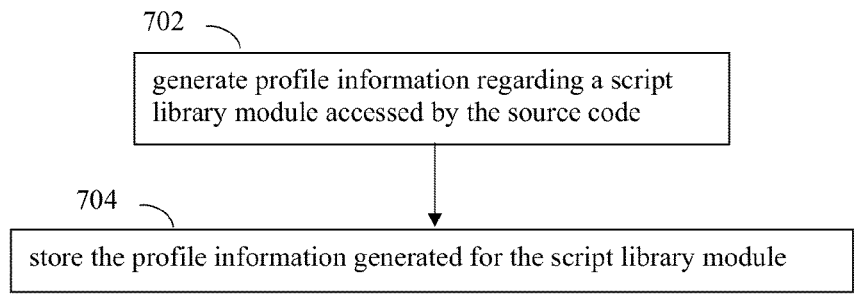
FIG. 7 shows a flowchart providing a process for generating profile information for a script library, according to an example embodiment.

In an embodiment, script library profiler 506 may perform a flowchart 700 in FIG. 7. Flowchart 700 provides a process for generating profile information for a script library, according to an example embodiment. Flowchart 700 is described as follows.

Flowchart 700 begins with step 702. In step 702, profile information is generated regarding a script library module accessed by the source code. For example, in an embodiment, script library profiler 506 may determine any script library modules of script library 318 that are accessed by bytecode 324 during the execution of source code 208, and may indicate these accessed script library modules in profile information 320. Script library profiler 506 may indicate the accessed script library modules in any manner, including by module name, module storage location, etc.

In step 704, the profile information generated for the script library module is stored. For instance, as shown in FIG. 3, profile information 320, which may include the accessed library module profile information, may be stored in storage 314.

As such, various types of profile information may be collected in various ways. The collected profile information may be used to optimize (e.g., improve) performance of source code. The following subsection describes example embodiments for optimizing source code portions based on profile information.

C. Example Embodiments for Optimizing Portions of a Script Based on Profile Information As described above with respect to FIGS. 3 and 4, the execution of script source code 208 by runtime engine 300 may be improved based on profile information 320. For instance, portions of bytecode 324 may be compiled and executed on the fly rather than being interpreted to improve script execution efficiency. In embodiments, to improve script performance, run time engine 300 may compile portions of a script for execution based on an analysis of script profile information.

Figure 8:
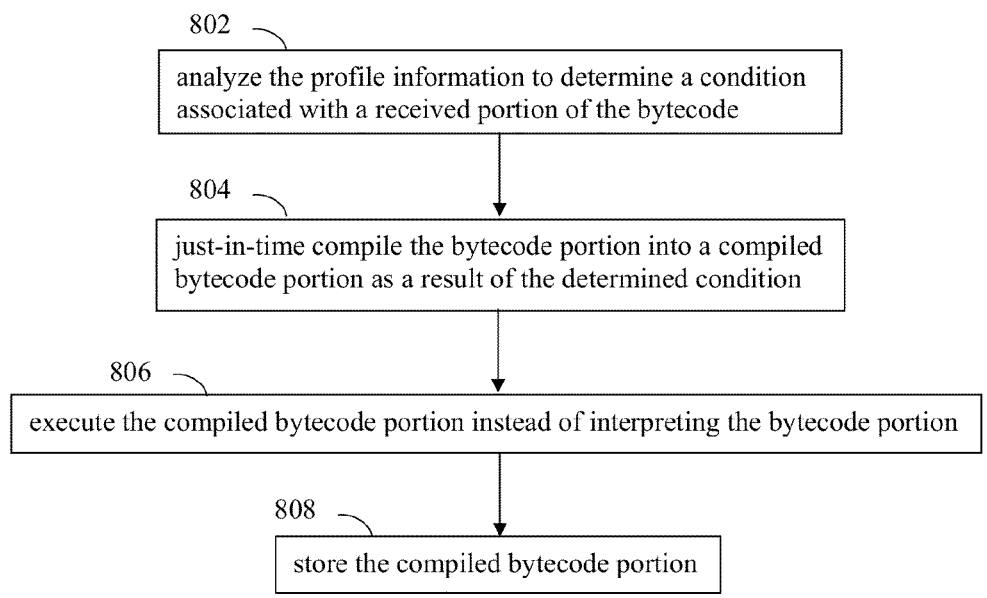
FIG. 8 shows a flowchart providing a process for compiling a portion of a script based on profile information for the script, according to an example embodiment.

For instance, FIG. 8 shows a flowchart 800 providing a process for compiling a portion of a script based on profile information for the script, according to an example embodiment. In an embodiment, runtime engine 300 of FIG. 3 may perform flowchart 800. Further structural and operational embodiments will be apparent to persons skilled in the relevant art(s) based on the following discussion regarding flowchart 800.

Flowchart 800 begins with step 802. In step 802, the profile information is analyzed to determine a condition associated with a received portion of the bytecode. For example, as shown in FIG. 3, execution controller 308 receives bytecode 324 and profile information 320. In an embodiment, execution controller 308 may analyze profile information 320 to determine whether a portion of bytecode 324 may be interpreted, or may be compiled rather than interpreted to improve execution efficiency. Various conditions may be determined by execution controller 308 during the analysis that indicate that a received bytecode portion, such as a function, a loop body, a typed object, bytecode associated with an array, bytecode associated with an expression, or other bytecode portion, may be compiled to improve execution efficiency. For instance, if a function is called in bytecode 324 a predetermined number of times, it may be desirable for the function to be compiled rather than interpreted.

In step 804, the bytecode portion is just-in-time compiled into a compiled bytecode portion as a result of the determined condition. For example, as shown in FIG. 3, execution controller 308 may generate compiler control signal 328 to indicate to JIT compiler 312 to compile the bytecode portion. As such, when JIT compiler 312 is instructed by compiler control signal 328, JIT compiler 312 compiles the portion of bytecode 324 to generate compiled bytecode 330. Compiled bytecode 330 may be referred to as "jitted" bytecode or "jitted" code because it is compiled on request, just-in-time.

In step 806, the compiled bytecode portion is executed instead of interpreting the bytecode portion. For instance, as shown in FIG. 3, compiled bytecode 330 is received by machine code executor 316 (e.g., one or more processors), which executes compiled bytecode 330. Note that step 806 may or may not be performed, depending on the particular embodiment. For instance, in one embodiment, rather than interpreting the bytecode portion using interpreter 310, compiled bytecode 330 may be generated and executed. In another embodiment, the bytecode portion may be interpreted using interpreter 310, and compiled bytecode 330 may be generated but not executed. Instead, in such an embodiment, compiled bytecode 330 is generated so that it can be executed a next time the corresponding bytecode portion is encountered in bytecode 324.

In step 808, the compiled bytecode portion is stored. For instance, as shown in FIG. 3, compiled bytecode 330 may be stored in storage 314 for access during subsequent execution of source code 208 by runtime engine 300.

Figure 9:
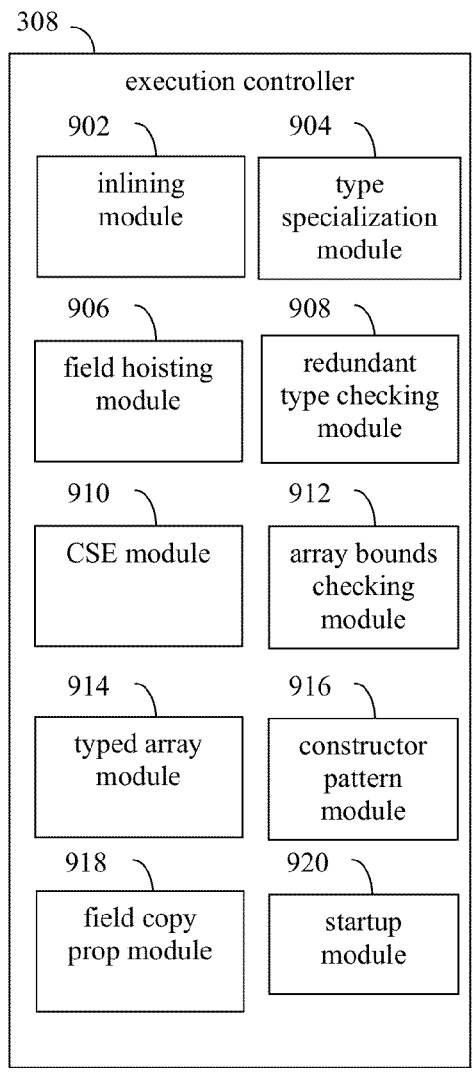
FIG. 9 shows a block diagram of an execution controller that includes code optimization modules, according to an example embodiment.

Execution controller 308 may be configured in various ways to perform step 802 to detect various conditions in profile information for selecting between interpreting and compiling bytecode. If one or more desired conditions are detected, it may be desired to generate compiled machine code to be executed rather than interpreting code. For instance, FIG. 9 shows a block diagram of execution controller 308 of FIG. 3, according to an example embodiment. As shown in FIG. 9, execution controller 308 includes a plurality of code execution optimizer modules, including an inlining module 902, a type specialization module 904, a field hoisting module 906, a redundant type checking module 908, a CSE (common sub-expression elimination) module 910, an array bounds checking module 912, a typed array module 914, a constructor pattern module 916, a field copy prop module 918, and a startup module 920. Any one or more of these code execution optimizer modules may be present in execution controller 308 to detect the presence of one or more corresponding conditions, and to perform an optimization (e.g., compiling particular bytecode to generate machine code, etc.) if the one or more conditions is/are detected. These features of execution controller 308 are described as follows.

Inlining module 902 is configured to analyze profile information 320 to determine conditions where bytecode portions of bytecode 324 may be performed multiple times without change to functions, objects, etc. within the bytecode portions. When inlining module 902 determines such a bytecode portion, inlining module 902 may replace the bytecode portion with machine code generated for the bytecode portion by JIT compiler 312, in effect "inlining" the machine code in bytecode 324. The machine code may be executed faster, improving overall program runtime efficiency. For instance, profile information 320 may indicate that a bytecode portion includes a first function that calls a second function. If profile information 320 indicates that the first function is called multiple times, and calls the second function each time, machine code for the second function may be generated that is used to replace the second function in the first function.

For instance, in the following example of JavaScript™, a first function "foo( )" may call a second function "bar( )" in source code 208:

```
function foo( )
{
    WScript.Echo("In foo( )");
    blah( );
}
function bar( )
{
    WScript.Echo("In bar( )");
}
blah = bar;
foo( );
```

When this code is executed, the following text is printed:
  In foo( )
  In bar( )
However, the assignment "blah=bar" may be hidden in various ways. In such case, JIT compiler 312 may not be able to determine statically what code will be executed when calling blah( ) and blah( ) could be calling different functions at different invocations of the function foo( ) Profile information 320 may indicate to inlining module 902 that, in this case, the assignment "blah( )" always calls "bar( )". As such, JIT compiler 312 may generate machine code that is equivalent to the following script code:

```
function foo( )
{
    WScript.Echo("In foo( )");
    if (blah == bar)
        WScript.Echo("In bar( )");
    else
        bailout_to_interpreter( );
}
```

In this example, machine code for the function "bar( )" is inlined into the function "foo( )" by inlining module 902. This increases program efficiency by avoiding the overhead of making a separate call to "bar( )". Furthermore, in this example, "foo( )" may be configured by inlining module 902 such that a "bailout" may occur if "blah( )" does not call "bar( )". In such a case, the original JavaScript™ script shown above may be performed (by interpreter 310) rather than the version of "foo( )" with inlined machine code for "bar( )". Bailouts are described in additional detail further below.

Type specialization (TS) module 904 is configured to analyze profile information 320 to determine conditions where bytecode portions of bytecode 324 contain typed objects that maintain a same type during multiple executions by interpreter 310 (e.g., a predetermined number of times, such as 2 times, 5 times, of other predetermined number of times). When TS module 904 determines such a bytecode portion, TS module 904 may direct JIT compiler 312 (via signal 328) to compile the bytecode portion into machine code, with the object having the same type as has been repeatedly used. During source code execution, execution controller 308 may point to the generated machine code, which can be executed faster than interpreter 310 can interpret the bytecode portion.

For example, with respect to JavaScript™, an expression may have typed objects x, y, and w, as shown below:

```
{
    x = y + w;
}
```

TS module 904 may determine from profile information 320 that y and w have consistent types over multiple previous executions by interpreter 310 (e.g., being of type integer, floating point, string, etc.). If their types are consistent (e.g., floating point), TS module 904 may direct JIT compiler 312 to compile their bytecode into machine code that assumes that y and w are of the type that has previously been occurring. Machine code may be generated to perform the addition of "y+w" with the assumption that y and w are their particular recurring types (e.g., floating point). This increases program efficiency by avoiding the overhead of handling the possibility that their types may change from one execution iteration to a next execution iteration, as is possible in a dynamic language.

Field hoisting module 906 is configured to analyze profile information 320 to determine whether any implicit calls are present in bytecode 324 that may disallow JIT compiler 312 from performing field hoisting. To perform field hoisting, JIT compiler 312 may determine portions of bytecode 324 that contain objects with properties that maintain a same value during multiple executions by interpreter 310 (e.g., a predetermined number of times, such as 2 times, 5 times, of other predetermined number of times), such as during a loop. In such cases, JIT compiler 312 may compile the bytecode portion into machine code, to reference the previously used object property value in a register or other location, where it has been loaded. Field hoisting module 906 may analyze profile information 320 to determine whether there are any implicit calls in the loop, as these could undesirably modify property values. If no implicit calls are present, the machine code may be generated and used. If implicit calls are present, the machine code may not be generated. During source code execution, execution controller 308 may point to the generated machine code, which can be executed faster than interpreter 310 can interpret the bytecode portion.

For example, with respect to JavaScript™, an expression may have an object "o" that has a property "x" (represented as "o.x"), as shown in the "For" loop below:

```
For (i = 0; i < 1000; i++){
    y = y + o.x
}
```

The property "o.x" is not invariant if (1) o is directly modified (o=o2), (2) o.x is directly modified (o.x=10;), (3) an explicit function call modifies o or o.x, or (4) an implicit function call modifies o or o.x. JIT compiler 312 may recognize (1), (2), or (3). However, (4) is difficult to determine statically. For instance, "y" or "o.x" may point to objects with a "valueof( )" member function overridden by a version that modifies "o.x" itself. As such, field hoisting module 906 may determine from profile information 320 that there were no implicit calls previously. In such case, the value may be loaded in a register in memory, where it may be rapidly accessed. JIT compiler 312 may compile bytecode into machine code that accesses the property value stored in the register. For instance, the property value may be loaded into a register referred to as "T1", which may be referenced in the generated machine code (e.g., "y=y+T1" in the example above). This increases program efficiency by avoiding the overhead of assuming that the property value may change from one execution iteration to a next execution iteration, as is possible in a dynamic language. Some runtime checks may be performed to ensure that no implicit calls occur. If an implicit call occurs during runtime, a bailout to interpreter 310 may be performed.

Redundant type checking (RTC) module 908 is configured to analyze profile information 320 to determine whether any implicit calls are present in bytecode 324 that may disallow JIT compiler 312 from performing redundant type checking. To perform redundant type checking, JIT compiler 312 may determine portions of bytecode 324 where an object has multiple properties, and similar type checking is being performed each time a property value of the object is loaded in bytecode 324. In such cases, JIT compiler 312 may compile the bytecode portion into machine code to more efficiently load the property values at the same time, and to perform the type checking for the multiple property values together, for the same object. RTC module 908 may analyze profile information 320 to determine whether between the two or more property values loads there are any implicit calls that may change the shape of the object. If no implicit calls are present, the machine code may be generated and used. If implicit calls are present, the machine code may not be generated. During source code execution, execution controller 308 may point to the generated machine code, which can be executed faster than interpreter 310 can interpret the bytecode portion.

For example, with respect to JavaScript™, an object "o" may have properties "x" and "y" (represented as "o.x" and "o.y") that are accessed at different times in source code, as shown below:

$$z = o \cdot x;$$
$$\ldots$$
$$w = o \cdot y$$

RTC module 908 may check profile information 320 whether any implicit calls are likely to be present between the two property value loads. If such property value loads are present without the intervening implicit calls being likely, JIT compiler 312 may compile the bytecode into machine code that enables the property value loadings and type checking to be performed together in a more unified manner. For instance, the property values may be loaded for both o.x and o.y at the same time, and the type checking may be performed together for o.x and o.y. This increases program efficiency by avoiding the overhead of separate iterations of property value loading and type checking.

CSE module 910 is configured to analyze profile information 320 to determine whether any implicit calls are present in bytecode 324 that may disallow JIT compiler 312 from performing common sub-expression elimination. To perform common sub-expression elimination, JIT compiler 312 may determine portions of bytecode 324 that contain a common expression being evaluated multiple times by interpreter 310 (e.g., a predetermined number of times, such as 2 times, 5 times, of other predetermined number of times). In such cases, the solution of the expression may be stored in a register in memory or other location, and JIT compiler 312 may compile the bytecode portion into machine code to reference the expression solution in the register or other location. CSE module 910 analyzes profile information 320 to determine whether between the expression evaluations there are any implicit calls that may change the expression value. If no implicit calls are present, the machine code may be generated and used. If implicit calls are present, the machine code may not be generated. Execution controller 308 may point to the generated machine code when the expression is encountered during execution, from which the expression solution can be loaded.

For example, with respect to JavaScript™, the expressions "y" and "w" may be same, but may be separately evaluated, as shown in an example below:

$$y = a + b + c;$$
$$\ldots$$
$$w = a + b + c;$$

CSE module 910 may check profile information 320 whether any implicit calls are likely to be present between the two expressions that change the expression value (e.g., such as b pointing to an object with a valueof( ) function that returns a different value each time). In such case, and if the implicit calls are determined to be unlikely (e.g., determined to not have occurred, determined to not have occurred with high probability (e.g., 90% probability of not occurring), etc.), JIT compiler 312 may cause the expression to be evaluated, and the solution to be stored in a register (e.g., referred to as "T1"). Furthermore, JIT compiler 312 may compile the bytecode into machine code that loads the property value from the register, rather than evaluating the expression, as follows:

$$T1 = a + b + c;$$
$$y = T1;$$
$$\ldots$$
$$w = T1;$$

This increases program efficiency by avoiding the overhead of evaluating the expression multiple times.

Array bounds checking (ABC) module 912 is configured to analyze profile information 320 to check conditions where bytecode portions of bytecode 324 contain arrays. ABC module 912 may direct JIT compiler 312 (via signal 328) to compile a bytecode portion into machine code that more efficiently handles an array. For instance, ABC module 912 may check whether an object is an array, whether an index being applied to the array is within the preset bounds of the array, and if so, to enable JIT compiler 312 to generate machine that enables values for the array to be directly loaded from the array.

For example, with respect to JavaScript™, an array "A[i]" may be defined to have a length of "length" in a "For" loop, as shown below:

```
For (i = 0; i < A.length : i++)
{
    x = x + A[i]
}
```

In this example, ABC module 912 may check whether "A[i]" is an array, and whether a value of "i" is within the bounds of array "A[i]" (e.g., is less than "length"). If profile information 320 indicates that during previous iterations, the value of "i" has been within the preset bounds, ABC module 912 may direct JIT compiler 312 to compile a bytecode portion corresponding to the above code into machine code so that array values may be loaded directly from array "A[i]" stored in memory. This may increase program efficiency by avoiding the overhead of checking the array "A[i]" multiple times. However, if ABC module 912 determines that "i" has previously been outside bounds of array "A[i]", this optimization may not be made.

Typed array module (TAM) module 914 is configured to analyze profile information 320 to check conditions where bytecode portions of bytecode 324 contain a typed array being evaluated by interpreter 310 according to a particular type. If profile information 320 indicates that an array is consistently evaluated as having a same type (e.g., an integer array, a floating point array, a string array, etc.), ABC module 912 may direct JIT compiler 312 (via signal 328) to compile a bytecode portion into machine code that processes the array according to the specific type.

For example, with respect to JavaScript™, an array "A[i]" may be used in an expression, as shown in an example below:

$$x+=A[i]$$

JavaScript™ supports various types of arrays, including a normal array that contains values of any type, a floating point array (only includes floating point numbers), an integer array (that includes only integers), etc. Without profile information 320, array "A[i]" may be considered to be a normal array. If profile information 320 indicates that array "A[i]" has previously included a single type, ABC module 912 may direct JIT compiler 312 (via signal 328) to compile a bytecode portion for the above expression into machine code that processes the array according to the specific type. This may increase program efficiency by avoiding the overhead of handling all possible types for the array "A[i]".

Constructor pattern module 916 is configured to analyze profile information 320 to determine whether any implicit calls are present in bytecode 324 that may disallow JIT compiler 312 from performing constructor pattern optimization. To perform a constructor pattern optimization, JIT compiler 312 may determine portions of bytecode 324 that indicate an object is being constructed during execution by interpreter 310. In such cases, JIT compiler 312 may compile the bytecode portion into machine code, to more efficiently construct the object. Constructor pattern module 916 analyzes profile information 320 to determine whether there are any implicit calls while constructing the object (because these implicit calls may have added/deleted fields). If no implicit calls are present, the machine code may be generated and used. If implicit calls are present, the machine code may not be generated. During source code execution, execution controller 308 may point to the generated machine code, which can be executed faster than interpreter 310 can interpret the bytecode portion.

For example, with respect to JavaScript™, an object "o" may be constructed by adding properties to it, such as the three properties "x", "y", and "w", in separate statements as shown in an example below:

o.x=1
o.y=2
o.w=3

In this example, prior to the above three statements, the object "o" does not include the properties "x", "y", and "w". As shown above for this example, a value is assigned to each property when the property is added to object "o". Constructor pattern module 916 may check profile information 320 whether any implicit calls occur while constructing the object "o" that may change the shape of object "o". If the implicit calls are determined to be unlikely, JIT compiler 312 may compile the bytecode into machine code that adds the three properties to the object "o" in a single operation, and that captures the property values for the three properties. This increases program efficiency by avoiding the overhead of adding multiple properties to an object over multiple separate operations.

Field copy propagation (FCP) module 918 is configured to analyze profile information 320 to determine whether any implicit calls are present in bytecode 324 that may disallow JIT compiler 312 from performing field copy propagation. To perform field copy propagation, JIT compiler 312 may determine bytecode portions of bytecode 324 that contain references to an object property that was previously assigned a value. In such cases, JIT compiler 312 may compile the bytecode portion(s) into machine code that replaces the object property references with the previously assigned value. FCP module 918 analyzes profile information 320 to determine whether there are any implicit calls between the references that may change the property value. If no implicit calls are present, the machine code may be generated and used. If implicit calls are present, the machine code may not be generated. During source code execution, execution controller 308 may point to the generated machine code, which can be executed faster than interpreter 310 can interpret the bytecode portion(s).

For example, as shown below with respect to JavaScript™, a property "x" of an object "o" may be assigned a value "1", and subsequently, an object "y" may be assigned the value of the property value "x":

$$o \cdot x = 1$$

$$\ldots$$

$$y = o \cdot x$$

FCP module 918 may check profile information 320 whether any implicit calls occur between the two operations with o.x (that may change the value of o.x). In such case, and if the implicit calls are determined to be unlikely, the expression of "o.x" may be replaced with the actual value of "1" (e.g., y=1). JIT compiler 312 may compile the bytecode into machine code that replaces "o.x" with the value "1". This increases program efficiency by avoiding the overhead of looking up the property value each time "o.x" is encountered in bytecode.

Startup module 920 is configured to cause startup bytecode to be executed first when a script is executed. For example, as described above, startup profiler 504 of FIG. 5 is configured to analyze bytecode 324 for bytecode that is used at the beginning of the execution of source code 208, and to indicate this "startup" bytecode in profile information 320. Startup module 920 of FIG. 9 is configured to cause the startup bytecode indicated in profile information 320 to be executed prior to other bytecode when a script begins execution.

Figure 10:
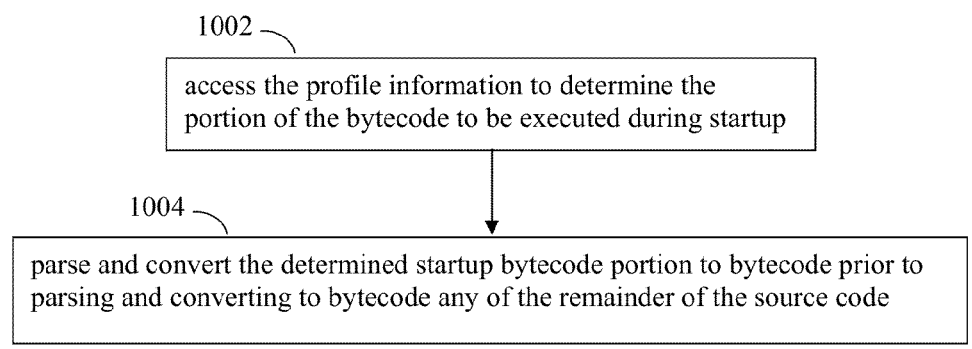
FIG. 10 shows a flowchart providing a process for using profile information to improve script startup, according to an example embodiment.

For instance, FIG. 10 shows a flowchart 1000 providing a process for using profile information to improve script startup, according to an example embodiment. In an embodiment, startup module 920 may perform flowchart 1000. Flowchart 1000 is described as follows.

Flowchart 1000 begins with step 1002. In step 1002, the profile information is accessed to determine the portion of the bytecode to be executed during startup. As described above, startup module 920 may access profile information 320 to determine startup bytecode indicated to be executed at the beginning of execution of source code 208. In an embodiment, the startup bytecode may be associated with an identifier for source code 208. For example, in an embodiment, startup profiler 504 of FIG. 5 may generate a hash value or other identifier for source code 208 when identifying startup bytecode for source code 208. The hash value (or other identifier) may be indicated in profile information 320 with the indication of the startup bytecode. When source code 208 is again executed from the beginning, startup module 920 may generate a hash value (or other identifier) for source code 208, and may compare the generated hash value with the hash value stored in profile information 320 to identify source code 208 and its indicated startup bytecode. In other embodiments, the startup bytecode for source code 208 may be identified in profile information 320 in another manner.

In step 1004, the determined startup bytecode portion is parsed and converted to bytecode prior to parsing and converting to bytecode any of the remainder of the source code. For instance, once startup module 920 determines the startup bytecode in profile information 320, startup module 920 may instruct parser 304 of FIG. 3 to parse the portion of source code 208 corresponding to the startup bytecode prior to any other portion of source code 208. In this manner, bytecode generator 306 generates the startup bytecode first, and source code 208 can start executing more rapidly.

As such, compiled bytecode may be generated for portions of source code based on profile information. The compiled bytecode may be executed so that the source code may be executed more efficiently. Furthermore, the compiled bytecode may be saved to be used during future source code execution. The following subsection describes example embodiments for subsequent source code execution that is enhanced using stored compiled bytecode.

D. Example Embodiments for Improving Subsequent Script Execution Based on Profile Information As described above, based on profile information, portions of a script may be compiled and executed on the fly rather than being interpreted to improve script execution efficiency. In embodiments, the profile information may be saved in persistent storage to be used later on during the current execution of the script, and/or to be used in future executions of the script. For instance, the profile information may be accessed in persistent storage, and cached in memory for use during subsequent script executions. During such subsequent script executions, additional profile information may or may not be generated. By accessing the previously generated profile information, a script may be executed more efficiently by using previously generated machine code.

Runtime engine 300 of FIG. 3 may operate to improve script execution performance using previously generated profile information in various ways, in embodiments. For instance, FIG. 11 shows a block diagram of execution controller 308 of FIG. 3, according to an example embodiment.

Figure 11:
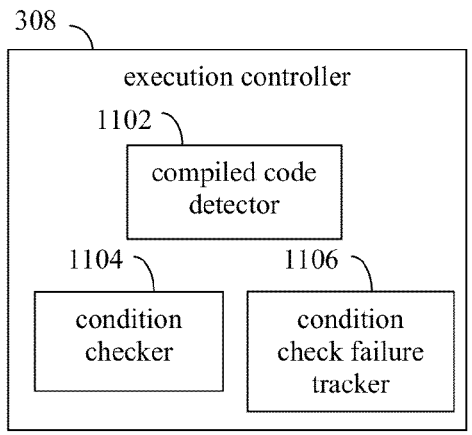
FIG. 11 shows a block diagram of an execution controller configured for execution of stored compiled bytecode, according to an example embodiment.

As shown in FIG. 11, execution controller 308 includes a compiled code (CC) detector 1102, a condition checker 1104, and a condition check failure (CCF) tracker 1106. Any one or more of these features may be included in execution controller 308, in embodiments. These features of execution controller 308 are described as follows.

CC detector 1102 is configured to check whether compiled bytecode for bytecode 324 currently to be executed has already been generated and stored in storage. For instance, FIG. 3 shows compiled bytecode 332 stored in storage 314. Compiled bytecode 332 includes compiled bytecode that was previously generated by JIT compiler 312 for execution. If CC detector 1102 determines that compiled bytecode exists in storage for a portion of bytecode 324 that is about to be executed, CC detector 1102 may cause the compiled bytecode to be executed (e.g., by machine code executor 316) instead of bytecode being interpreted by interpreter 310 or being compiled by JIT compiler 332.

Condition checker 1104 is configured to perform one or more checks on compiled bytecode (e.g., compiled bytecode 332) to verify that conditions expected by the compiled bytecode are satisfied. If one or more of the expected conditions fail, condition checker 1104 may point execution of bytecode 324 to interpreter 310, which executes the bytecode 324 at the appropriate point, rather than executing compiled bytecode 332.

CCF tracker 1106 is configured to track condition failures determined by condition checker 1104. CCF tracker 1106 may maintain statistics about the failed conditions, and if a sufficient number of failed conditions for a compiled bytecode portion is registered, CCF tracker 1106 may instruct JIT compiler 312 to compile a new version of the compiled bytecode portion (to replace the compiled bytecode portion having failures).

Figure 12:
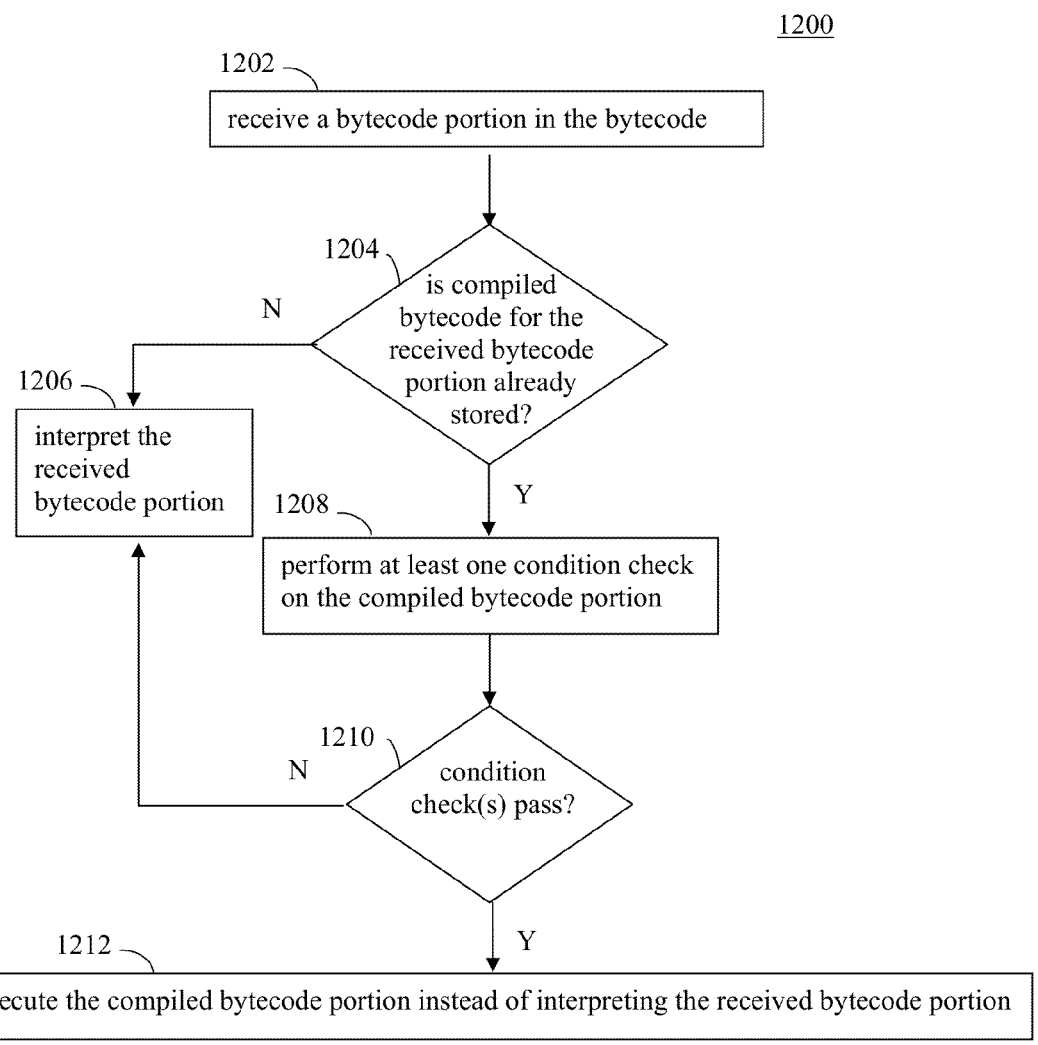
FIG. 12 shows a flowchart providing a process for executing a script, according to an example embodiment.

FIG. 12 shows a flowchart 1200 providing a process for executing a script, according to an example embodiment. In an embodiment, runtime engine 300 of FIG. 3 may perform flowchart 1200. Further structural and operational embodiments will be apparent to persons skilled in the relevant art(s) based on the following discussion regarding flowchart 1200. Flowchart 1200 is described as follows with regard to FIG. 13, which shows runtime engine 300 of FIG. 3.

Figure 13:
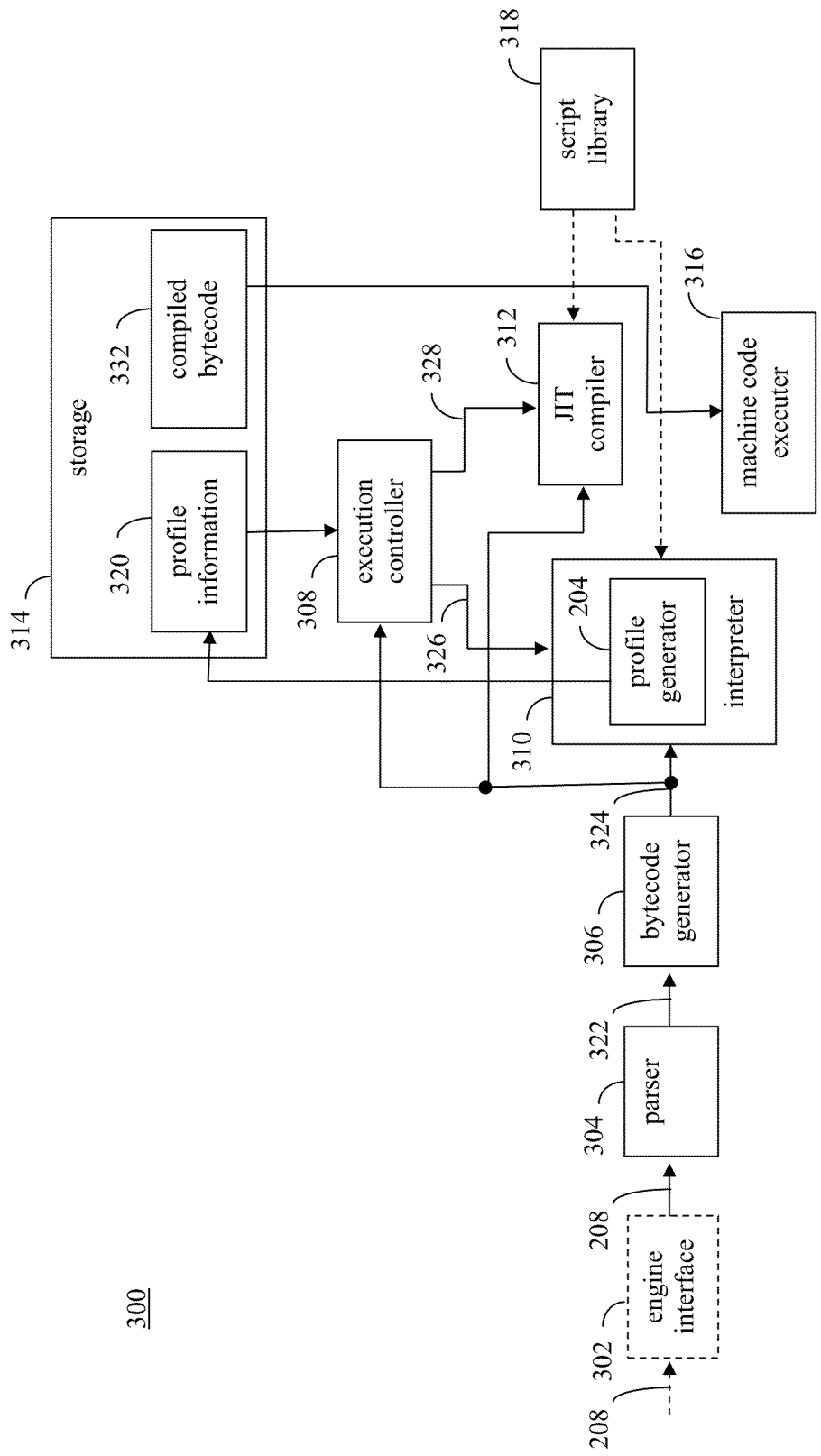
FIG. 13 shows a block diagram of the runtime engine of FIG. 3, where stored compiled bytecode is executed for a portion of a script, according to an example embodiment.

Flowchart 1200 begins with step 1202. In step 1202, a bytecode portion in the bytecode is received. For example, as shown in FIG. 13, a bytecode portion (e.g., a function, a loop, etc.) is received by execution controller 308 in bytecode 324.

In step 1204, whether compiled bytecode for the received bytecode portion is already stored is determined. For example, referring to FIG. 11, CC detector 1102 may determine whether compiled bytecode exists in storage 314 of FIG. 13 for the received portion of bytecode 324. If the compiled bytecode is not present, operation proceeds from step 1204 to step 1206. If the compiled bytecode is present, operation proceeds from step 1204 to step 1208.

In step 1206, the received bytecode portion is interpreted. Interpreter 310 of FIG. 3 may by enabled by execution controller 308 to interpret the bytecode portion of bytecode 324 because a compiled version of the bytecode portion does not already exist. For instance, in an embodiment, execution controller 308 may point execution of bytecode 324 to an address of interpreter 310, or may enable interpreter 310 to interpret the bytecode portion in other manner.

Note that alternatively, rather than performing step 1206 to interpret the bytecode portion, operation may proceed from step 1204 to step 802 of flowchart 800 (FIG. 8), to determine whether the bytecode portion may be optimized.

In step 1208, at least one condition check is performed on the compiled bytecode portion. In an embodiment, condition checker 1104 of FIG. 11 may perform one or more condition checks on the compiled bytecode portion that already exists in storage 314. For instance, one or more condition checks may be performed depending on the particular code execution optimizer module (FIG. 9) that was used to generate the compiled bytecode portion.

For instance, machine code for a second function may be generated by inlining module 902 to be inlined into a first function in bytecode 324 due to prior history indicated in profile information 310. However, if condition checker 1104 determines in a subsequent execution that a different function from the second function is performed in bytecode 324 during the first function, a failed condition occurs.

The other code optimizer modules of FIG. 9 may rely on no changes occurring to relevant objects, properties, types, expressions, calls to functions, and/or other bytecode features in bytecode 324. However, if such a change occurs, a failed condition may occur. For example, TS module 904 may assume that a type change to a relevant object does not occur; field hoisting module 906 may assume that hidden/implicit calls that change relevant property values do not occur; RTC module 908 may assume that a change to the structure of a relevant object does not occur; CSE module 910 may assume that hidden/implicit calls that change relevant object values do not occur; ABC module 912 may assume that an array index value does not go out of bounds; typed array module 914 may assume that changes to types of relevant arrays do not occur; constructor pattern module 916 may assume that changes to values of any of the expression objects do not occur; and FCP module 918 may assume that a relevant object property value is not changed. For each of these optimizations, if a critical assumption turns out to be incorrect, a condition failure occurs.

In step 1210, whether the condition check(s) passed is determined. If a condition check of step 1208 fails, operation proceeds from step 1210 to step 1206. If the condition check(s) of step 1210 passes, operation proceeds from step 1210 to step 1212.

In step 1212, the compiled bytecode portion is executed instead of interpreting the received bytecode portion. For instance, because compiled bytecode exists for a portion of bytecode 324, and any condition checks for the compiled bytecode portion passed, the compiled bytecode portion may be executed. In an embodiment, execution controller 308 may point execution of the compiled bytecode portion in storage 314 to an address of machine code executor 316, or may enable machine code executor 316 to execute the compiled bytecode portion in any other manner. For example, as shown in FIG. 13, compiled bytecode 332 to received at machine code executor 316 to be executed.

Note that if operation proceeds from step 1210 to step 1206 due to a condition failure, a "bailout" may be said to have occurred. In a "bailout," instead of executing already compiled bytecode, the corresponding bytecode portion in bytecode 324 is interpreted by interpreter 310. Such as bailout is a relatively expensive process, as slower interpretation of bytecode is performed rather than executing machine code. As such, in an embodiment, rather than performing a bailout due to a condition failure, a code module (e.g., "helper code") that is configured to correct the failed condition may be performed, and execution of the compiled bytecode portion may continue. Such helper code may be generated for any one or more of the code execution optimizer modules described above. For instance, with regard to TS module 904 and typed array module 914, helper code may be executed to handle the undesired type change that occurred.

Figure 14:
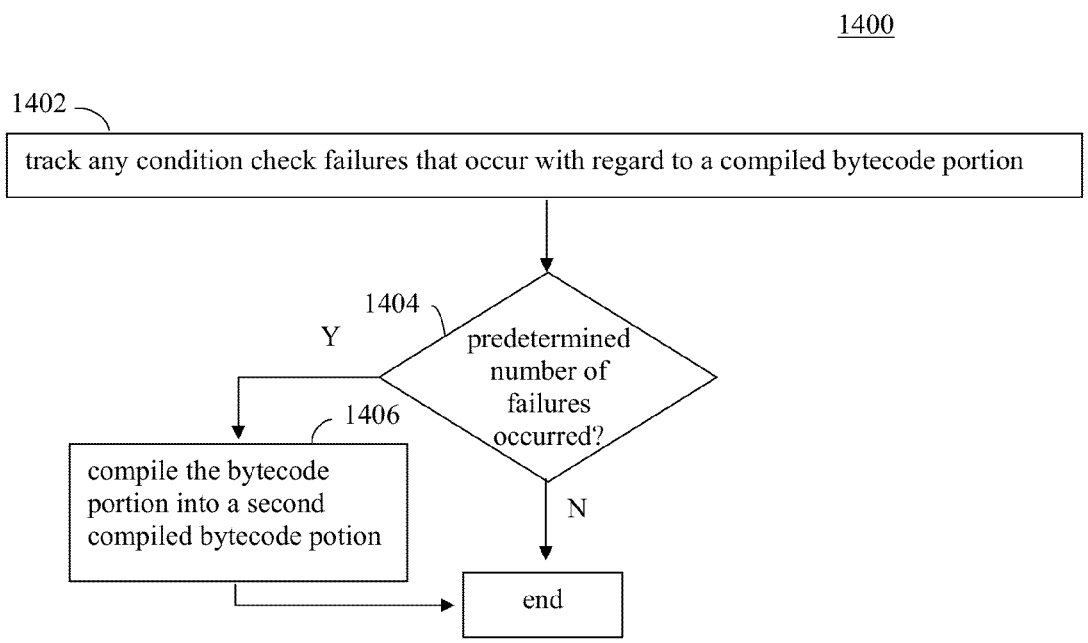
FIG. 14 shows a flowchart providing a process for tracking condition checks of compiled bytecode, according to an example embodiment.

Condition check failure (CCF) tracker 1106 of FIG. 11 may perform its functions in various ways. For instance, FIG. 14 shows a flowchart 1400 providing a process for tracking the condition checking of compiled bytecode, according to an example embodiment. Further structural and operational embodiments will be apparent to persons skilled in the relevant art(s) based on the following discussion regarding flowchart 1400.

Flowchart 1400 begins with step 1402. In step 1402, any condition check failures that occur with regard to a compiled bytecode portion is/are tracked. For example, as described above with respect to FIG. 11, CCF tracker 1106 may record any condition failures detected by condition checker 1104. For instance, CCF tracker 1106 may maintain a table or other data structure in storage (e.g., in memory) that indicates one or more compiled bytecode portions (e.g., by corresponding identifiers, etc.) that have had condition failures, and indicates a number of condition failures that have occurred for each indicated compiled bytecode portion.

In step 1404, whether a predetermined number of condition check failures have occurred is determined. In an embodiment, CCF tracker 1106 may compare the indicated number of condition failures for compiled bytecode portions to a predetermined unacceptable number of condition failures (e.g., 1, 2, 5, or other value).

In step 1406, the bytecode portion is compiled into a second compiled bytecode portion. For instance, in an embodiment, for each compiled bytecode portion that reaches the predetermined number of condition failures, CCF tracker 1106 may instruct JIT compiler 312 to recompile the bytecode corresponding to the failed compiled bytecode portion to generate a new compiled bytecode portion. The prior version of the complied bytecode portion may be deleted, and the new compiled bytecode portion may be stored in storage 314 for future access.

III Example Computing Device Embodiments

Runtime engine 202, profile generator 204, parser 304, bytecode generator 306, execution controller 308, interpreter 310, JIT compiler 312, machine code executor 316, code profiler 502, startup profiler 504, script library profiler 506, inlining module 902, type specialization module 904, field hoisting module 906, redundant type checking module 908, CSE module 910, array bounds checking module 912, typed array module 914, constructor pattern module 916, field copy prop module 918, startup module 920, compiled code detector 1102, condition checker 1104, condition check failure tracker 1106, flowchart 400, flowchart 600, flowchart 700, flowchart 800, flowchart 1000, flowchart 1200, and flowchart 1400 may be implemented in hardware, software, firmware, or any combination thereof.

For example, runtime engine 202, profile generator 204, parser 304, bytecode generator 306, execution controller 308, interpreter 310, JIT compiler 312, machine code executor 316, code profiler 502, startup profiler 504, script library profiler 506, inlining module 902, type specialization module 904, field hoisting module 906, redundant type checking module 908, CSE module 910, array bounds checking module 912, typed array module 914, constructor pattern module 916, field copy prop module 918, startup module 920, compiled code detector 1102, condition checker 1104, condition check failure tracker 1106, flowchart 400, flowchart 600, flowchart 700, flowchart 800, flowchart 1000, flowchart 1200, and/or flowchart 1400 may be implemented as computer program code configured to be executed in one or more processors. Alternatively, runtime engine 202, profile generator 204, parser 304, bytecode generator 306, execution controller 308, interpreter 310, JIT compiler 312, machine code executor 316, code profiler 502, startup profiler 504, script library profiler 506, inlining module 902, type specialization module 904, field hoisting module 906, redundant type checking module 908, CSE module 910, array bounds checking module 912, typed array module 914, constructor pattern module 916, field copy prop module 918, startup module 920, compiled code detector 1102, condition checker 1104, condition check failure tracker 1106, flowchart 400, flowchart 600, flowchart 700, flowchart 800, flowchart 1000, flowchart 1200, and/or flowchart 1400 may be implemented as hardware logic/electrical circuitry. For instance, in an embodiment, one or more runtime engine 202, profile generator 204, parser 304, bytecode generator 306, execution controller 308, interpreter 310, JIT compiler 312, machine code executor 316, code profiler 502, startup profiler 504, script library profiler 506, inlining module 902, type specialization module 904, field hoisting module 906, redundant type checking module 908, CSE module 910, array bounds checking module 912, typed array module 914, constructor pattern module 916, field copy prop module 918, startup module 920, compiled code detector 1102, condition checker 1104, condition check failure tracker 1106, flowchart 400, flowchart 600, flowchart 700, flowchart 800, flowchart 1000, flowchart 1200, and/or flowchart 1400 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 15:
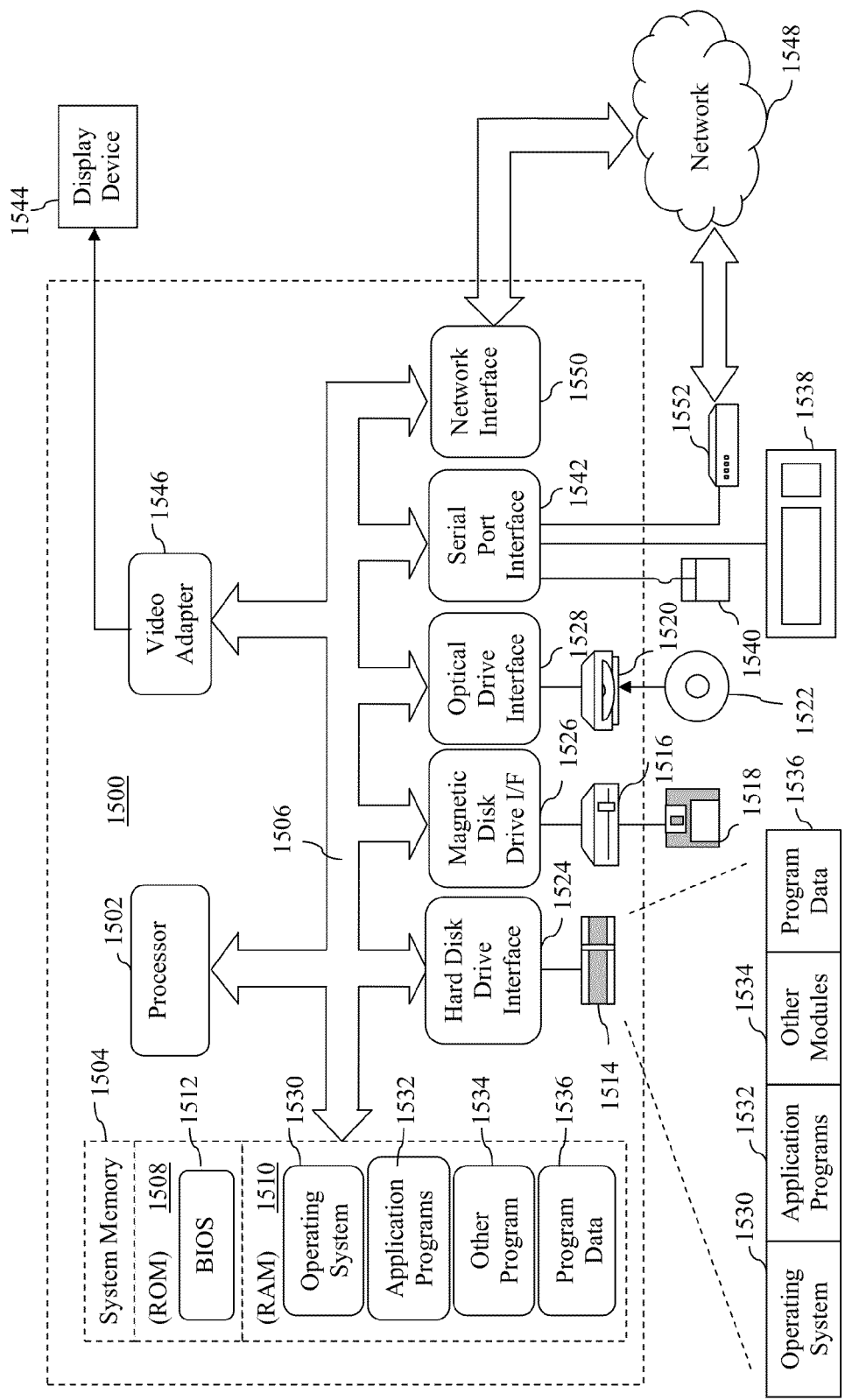
FIG. 15 shows a block diagram of an example computer that may be used to implement embodiments of the present invention.

FIG. 15 depicts an exemplary implementation of a computer 1500 in which embodiments of the present invention may be implemented. For example, computing device 102 and/or server 104 may be implemented in a computer system similar to computer 1500, including one or more features of computer 1500 and/or alternative features. Computer 1500 may be a general-purpose computing device in the form of a conventional personal computer, a mobile computer, a server, or a workstation, for example, or computer 1500 may be a special purpose computing device. The description of computer 1500 provided herein is provided for purposes of illustration, and is not intended to be limiting. Embodiments of the present invention may be implemented in further types of computer systems, as would be known to persons skilled in the relevant art(s).

As shown in FIG. 15, computer 1500 includes one or more processors 1502, a system memory 1504, and a bus 1506 that couples various system components including system memory 1504 to processor 1502. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computer 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1530, one or more application programs 1532, other program modules 1534, and program data 1536. Application programs 1532 or program modules 1534 may include, for example, computer program logic (e.g., computer program code) for implementing runtime engine 202, profile generator 204, parser 304, bytecode generator 306, execution controller 308, interpreter 310, JIT compiler 312, machine code executor 316, code profiler 502, startup profiler 504, script library profiler 506, inlining module 902, type specialization module 904, field hoisting module 906, redundant type checking module 908, CSE module 910, array bounds checking module 912, typed array module 914, constructor pattern module 916, field copy prop module 918, startup module 920, compiled code detector 1102, condition checker 1104, condition check failure tracker 1106, flowchart 400, flowchart 600, flowchart 700, flowchart 800, flowchart 1000, flowchart 1200, and/or flowchart 1400 (including any step of flowcharts 400, 600, 700, 800, 1000, 1200, and 1400), and/or further embodiments described herein.

A user may enter commands and information into the computer 1500 through input devices such as keyboard 1538 and pointing device 1540. Other input devices (not shown) may include a microphone, joystick, game pad, satellite dish, scanner, or the like. These and other input devices are often connected to processor 1502 through a serial port interface 1542 that is coupled to bus 1506, but may be connected by other interfaces, such as a parallel port, game port, or a universal serial bus (USB).

A display device 1544 is also connected to bus 1506 via an interface, such as a video adapter 1546. In addition to the monitor, computer 1500 may include other peripheral output devices (not shown) such as speakers and printers.

Computer 1500 is connected to a network 1548 (e.g., the Internet) through an adaptor or network interface 1550, a modem 1552, or other means for establishing communications over the network. Modem 1552, which may be internal or external, is connected to bus 1506 via serial port interface 1542.

As used herein, the terms "computer program medium," "computer-readable medium," and "computer-readable storage medium" are used to generally refer to media such as the hard disk associated with hard disk drive 1514, removable magnetic disk 1518, removable optical disk 1522, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1532 and other program modules 1534) may be stored on the hard disk, magnetic disk, optical disk, ROM, or RAM. Such computer programs may also be received via network interface 1550 or serial port interface 1542. Such computer programs, when executed or loaded by an application, enable computer 1500 to implement features of embodiments of the present invention discussed herein. Accordingly, such computer programs represent controllers of the computer 1500.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
   receiving source code coded in a dynamic language for execution;
   parsing the source code to generate parsed source code;
   converting, by one or more processors, the parsed source code to bytecode;
   interpreting the bytecode using an interpreter;
   generating profile information regarding the interpreted bytecode,
   including generating profile information that indicates at least one of a loop body in the bytecode, at least one pattern in the bytecode, a portion of the bytecode that is not used, a function called in the bytecode, or a number of times the function is called during execution; and
   storing the profile information.

2. The method of claim 1, further comprising:
   analyzing the profile information to determine a condition associated with a received portion of the bytecode;
   just-in-time compiling the bytecode portion into a compiled bytecode portion as a result of the determined condition; and
   storing the compiled bytecode portion.

3. The method of claim 2, further comprising:
receiving the bytecode portion in the bytecode at the interpreter;
determining that the compiled bytecode portion corresponding to the received bytecode portion is stored;
performing at least one condition check on the compiled bytecode portion; and
executing the compiled bytecode portion instead of interpreting the received bytecode portion if the at least one condition check passes.

4. The method of claim 3, further comprising:
tracking any condition check failures that occur with regard to the compiled bytecode portion; and
compiling the bytecode portion into a second compiled bytecode portion if a predetermined number of the condition check failures occur.

5. The method of claim 1, wherein said generating profile information regarding the bytecode comprises:
determining a portion of the bytecode that is executed during startup;
storing an indication in the profile information of the portion of the bytecode that is determined to be executed during startup; and
during a subsequent execution of the source code,
accessing the profile information to determine the portion of the bytecode that is indicated to be executed during startup, and
parsing the determined portion and converting the parsed determined portion to bytecode prior to parsing and converting to bytecode any of the remainder of the source code.

6. The method of claim 1, further comprising:
generating profile information regarding a script library module accessed by the source code; and
storing the profile information generated for the script library module.

7. A runtime engine in a computing device, comprising:
a parser that receives source code coded in a dynamic language and parses the source code to generate parsed source code;
a bytecode generator, at least partially implemented using one or more processors, that converts the parsed source code to bytecode;
an execution controller;
an interpreter that interprets the bytecode when enabled by the execution controller;
a just-in-time (JIT) compiler configured to compile the bytecode when enabled by the execution controller, the compiled bytecode being executed when the JIT compiler is enabled by the execution controller; and
a profile generator that generates profile information from the interpreted bytecode and stores the profile information, the profile generator generates and stores profile information that indicates at least one of a loop body in the bytecode, at least one pattern in the bytecode, a portion of the bytecode that is not used, a function called in the bytecode, or a number of times the function is called during execution;
wherein the execution controller enables the interpreter or the JIT compiler based on the profile information.

8. The runtime engine of claim 7, wherein the execution controller is configured to analyze the profile information to determine a condition associated with a received portion of the bytecode; and
the execution controller enables the JIT compiler, based on the determined condition, to compile the bytecode portion into a compiled bytecode portion, and the JIT compiler stores the compiled bytecode portion.

9. The runtime engine of claim 8, wherein the execution controller receives the bytecode portion in the bytecode, determines that the compiled bytecode portion corresponding to the received bytecode portion is stored, and causes the compiled bytecode portion to be executed instead of interpreting the received bytecode portion.

10. The runtime engine of claim 9, wherein the execution controller performs at least one condition check on the compiled bytecode portion, and enables the interpreter to interpret the received bytecode portion rather than executing the compiled bytecode portion if the at least one condition check fails.

11. The runtime engine of claim 10, wherein the execution controller tracks any condition check failures that occur with regard to the compiled bytecode portion, and causes the JIT compiler to compile the bytecode portion into a second compiled bytecode portion if a predetermined number of the condition check failures occur.

12. The runtime engine of claim 9, wherein the profile generator is configured to determine a portion of the bytecode that is executed during startup, and to store an indication in the profile information of the portion of the bytecode that is determined to be executed during startup.

13. The runtime engine of claim 12, wherein, during a subsequent execution of the source code, the execution controller accesses the profile information to determine the portion of the bytecode that is indicated to be executed during startup, and instructs the parser to parse the determined portion and the bytecode generator to convert the parsed determined portion to bytecode prior to parsing and converting to bytecode any of the remainder of the source code.

14. The runtime engine of claim 9, wherein the profile generator is configured to generate profile information regarding a script library module accessed by the source code, and to store the profile information generated for the script library module.

15. A method in a computing device, comprising:
receiving source code coded in a dynamic language for execution;
generating, by one or more processors, bytecode from the received source code;
receiving a portion of the bytecode at the interpreter;
determining that compiled bytecode corresponding to the received bytecode portion is stored; and
executing the compiled bytecode instead of interpreting the received bytecode portion.

16. The method of claim 15, further comprising:
interpreting a second portion of the bytecode received at the interpreter;
generating profile information regarding the second bytecode portion;
storing the profile information;
analyzing the profile information to determine a condition associated with the second bytecode portion; and
just-in-time compiling the second bytecode portion into second compiled bytecode as a result of the determined condition.

17. The method of claim 15, wherein said executing the compiled bytecode instead of interpreting the received bytecode portion comprises:
performing at least one condition check on the compiled bytecode;
executing the compiled bytecode instead of interpreting the received bytecode portion if the at least one condition check passes;

tracking any condition check failures that occur with regard to the compiled bytecode; and compiling the bytecode portion into a second compiled bytecode portion if a predetermined number of the condition check failures occur.

18. The method of claim 15, further comprising:

generating profile information regarding a script library module accessed by the source code; and storing the profile information generated for the script library module.

* * * * *